United States Patent
Gupta et al.

(10) Patent No.: US 12,464,204 B2
(45) Date of Patent: *Nov. 4, 2025

(54) SYSTEMS AND METHODS OF PROVIDING CONTENT SEGMENTS WITH TRANSITION ELEMENTS

(71) Applicant: Adeia Guides Inc., San Jose, CA (US)

(72) Inventors: Vikram Makam Gupta, Karnataka (IN); Srikanth Channapragada, Karnataka (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/735,792

(22) Filed: Jun. 6, 2024

(65) Prior Publication Data

US 2025/0024120 A1  Jan. 16, 2025

Related U.S. Application Data

(63) Continuation of application No. 17/389,884, filed on Jul. 30, 2021, now Pat. No. 12,041,321.

(51) Int. Cl.
| | |
|---|---|
| *H04N 21/84* | (2011.01) |
| *H04N 21/431* | (2011.01) |
| *H04N 21/472* | (2011.01) |
| *H04N 21/845* | (2011.01) |

(52) U.S. Cl.
CPC ..... *H04N 21/8456* (2013.01); *H04N 21/4316* (2013.01); *H04N 21/47217* (2013.01); *H04N 21/84* (2013.01); *H04N 21/8455* (2013.01)

(58) Field of Classification Search
CPC ........... H04N 21/8456; H04N 21/4316; H04N 21/47217; H04N 21/84; H04N 21/8455
See application file for complete search history.

(56) References Cited

U.S. PATENT DOCUMENTS

| | | | |
|---|---|---|---|
| 12,041,321 B2 | 7/2024 | Gupta et al. | |
| 2017/0278545 A1* | 9/2017 | Woodward, Jr. | G11B 27/10 |
| 2019/0349641 A1* | 11/2019 | Choi | G10L 15/02 |
| 2020/0074580 A1* | 3/2020 | Kakehi | G06T 1/00 |
| 2020/0275158 A1 | 8/2020 | Gaur et al. | |
| 2021/0350830 A1* | 11/2021 | Smith | H04N 21/8113 |
| 2022/0050974 A1* | 2/2022 | Ogawa | G06F 40/58 |
| 2023/0034050 A1 | 2/2023 | Gupta et al. | |

* cited by examiner

*Primary Examiner* — Thai Q Tran
*Assistant Examiner* — Jose M Mesa
(74) *Attorney, Agent, or Firm* — HALEY GUILIANO LLP

(57) ABSTRACT

Systems and methods are provided for determining transition scenes in content and playing back transition scenes as overlays over one or more adjacent scenes. Transition scenes (also referred to as "pause scenes") are slow-moving scenes, with minimal activity or characters, usually surrounded by two faster paced scenes, that may bore certain viewers such as children or mobile device users. The system may help the content move faster, while ensuring the transition scenes are not skipped. The system may receive content with three sequential scenes A, B, and C, and determine scene B is a transition scene between scene A and scene C. Scene B may be generated as an overlay to one of (or parts of both) scene A and scene C so that all three scenes are viewed but the runtime is shorter, and the content's pace is maintained. The system may also determine which scene to overlay, and determine a screen position for the overlay so as not to, e.g., obscure any characters or activity in the content.

20 Claims, 13 Drawing Sheets

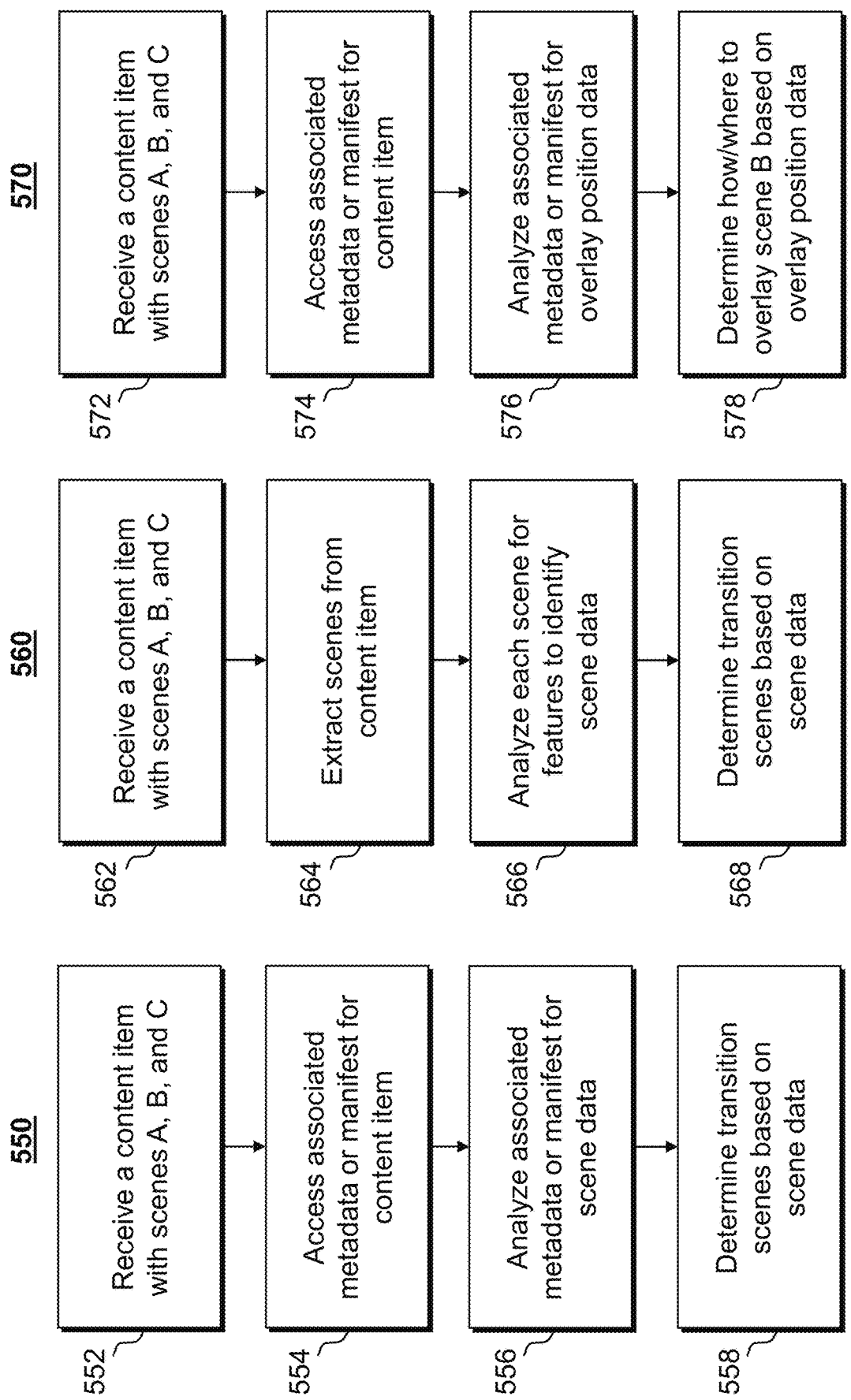

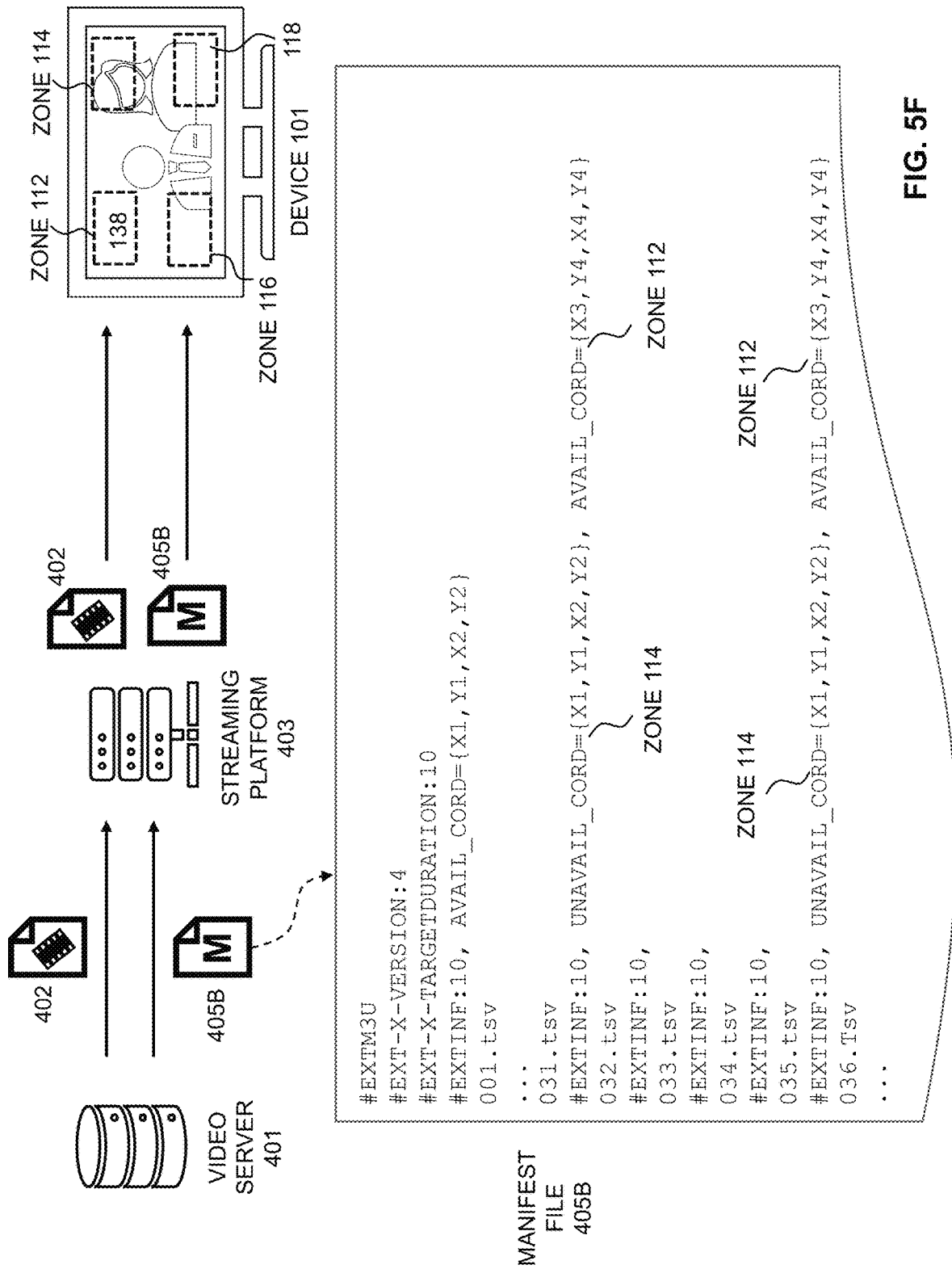

SYSTEMS AND METHODS OF PROVIDING CONTENT SEGMENTS WITH TRANSITION ELEMENTS

CROSS-REFERENCE TO RELATED APPLICATIONS

This application is a continuation of U.S. patent application Ser. No. 17/389,884, filed Jul. 30, 2021, which is hereby incorporated by reference herein in its entirety.

BACKGROUND

The present disclosure relates to content display, and more particularly to systems and related processes for providing transition scenes with other content segments via user interface.

SUMMARY

Some content consumers may not appreciate slow-moving "transition" or "pause" scenes that are included in some programs, e.g., between two faster-paced and/or plot-heavy segments of content. Content featuring multiple transition scenes or elements throughout can also add significant, potentially unnecessary, duration time. In some cases, skipping transition scenes can reduce runtime, help hold viewer attention, and increase viewer enjoyment. Generally, in content delivery systems and interactive program interfaces, manual fast-forwarding or skip-ahead are the only ways to skip over dull transition sequences. Viewers trying to manually skip scenes may, however, skip too far ahead, miss important content portions, and/or lose focus on the program. There exists a need to expedite any perceivably boring transition elements and/or transition scenes without cutting scenes and without relying on manual control. To address these issues and others, transition scenes in a program may be automatically played back in windows overlaying parts of one or more surrounding scenes so that time spent may be reduced and the number of scenes viewed may be maximized.

As content is consumed, it may not always be appreciated by a consumer, e.g., in a way that is intended by the content's creator(s). For instance, a specific scene from a film may be slow, repetitive, unnecessary, and/or boring. Such a scene may lack dialogue, narration, characters, conflict, or activity. Transition scenes may include camera zooms (or pans) or long shots of settings. Transition elements may feature, for instance, extended scenes of nature, a road, landscapes, maps, changes of settings, silent/inactive characters, and similar seemingly inactive elements. Transition scenes may be artistically beautiful but not always necessary for understanding and following a narrative. Skipping a transition or "pause" scene may not be as detrimental to some casual viewers as, for instance, the scene may include details that nevertheless may be lost in the perceived dullness of the segment by those viewers. Moreover, even a well-planned, story-necessary scene may be produced for viewing at a cinema but actually consumed on a 5-inch mobile screen. A director may not contemplate how her film will be accepted by audiences who view it while riding a subway. An uninterested or tired audience may be a contributing factor to poor ratings and/or loss of viewership. For a casual content consumer, viewing one or more transition scenes may mean the difference between finishing the content or leaving the viewing of it incomplete.

Content delivery systems and interactive program interfaces should simplify and maximize the viewing experience. For instance, when the substance of a delivered program is not attractive to a content consumer, content delivery systems may be able to help present such content in such a way that it will be appreciated and fully consumed. Merely allowing fast-forward or skip-ahead of dull, boring scenes may be insufficient. User interfaces can identify scenes that an audience may find boring, anticipate a loss of focus or appreciation, and deliver a "transition" scene in such a way as to keep the program's momentum and ensure no detail is lost.

Accessibility is a practice of making interfaces usable by as many people as possible. For instance, accessible designs and development may allow use by those with disabilities and/or special needs. When content itself may not be accessible to all, interfaces may be able to improve content consumption. While content producers likely take care in making content accessible to all, a content delivery system and content playback interface may be able to do more to make content accessible and attractive to more viewers.

Content delivery systems and interactive program interfaces should not distract from or minimize the viewing experience. For instance, TV/video platforms and streaming applications should not force a content viewer to manually fast-forward or skip over boring scenes. Likewise, content delivery systems and interactive program interfaces should not over-interfere with a content creator's artistic vision and skip over scenes that were purposefully included in the content. Presentation issues may diminish content enjoyment, and vital information may be missed.

Unfortunately, modern viewer attention spans may be shorter. Transition scenes may not hold the attention of, e.g., a child or other younger viewer in the audience. A transition/pause scene may be intruded on by an outside distraction for a traveler watching a film on a bus, train, or plane. Viewers consuming content on a mobile phone may be interrupted by a text notification and may be more likely to leave the content to address the notification during a transition scene than during a scene with dialogue.

Viewers may find themselves skipping over boring scenes, e.g., transitions, by fast-forwarding, skipping ahead, and/or sliding a guide bar to move forward. Again, while content producers may frown on such behavior from their audiences, they would probably consider skipping scenes preferable to losing the viewer entirely. Skipped scenes are likely acceptable over a reputation of putting a viewer to sleep. Encouraging manual advancing through scenes, however, is not a suitable approach for handling issues with transition scenes.

For instance, when manually fast-forwarding to get to the next scene, extreme precision or a lot of luck is required to advance to the correct point and not miss anything from the next scene. Some approaches may digitally fast-forward and then go back a few seconds because of human error. Such approaches may help in some cases but may also result in fast-forwarding not enough before fast-forwarding too much (e.g., overshooting). Scrubbing on a time-tracking guide bar (e.g., on a phone or tablet) may produce similar undershooting and overshooting issues. A viewer may often overshoot scene advancement when simply sitting on his own couch, let alone if he were multitasking with activities like commuting on a train or exercising on a stationary bike. Overshooting can be more frustrating than a dull scene and, again, could cause a viewer to walk away from a program.

Some approaches may use a skip-ahead command with a predetermined amount of time (e.g., 30 seconds, 3 minutes, etc.). Scenes do not necessarily correspond to standard numbers. Such approaches likely require a combination of a few skips forward and backwards to find the next scene. Likewise, skip-ahead commands that accept any amount of time to advance, e.g., via a virtual assistant and a microphone command, require much guesswork by the viewer (and luck, again) to get to the next scene. Thus, skip-ahead commands are not a viable solution for skipping a transition scene.

Even if there were approaches that could skip a transition scene easily, the scene would still be skipped and details important to the narrative could be missed by the viewer. For instance, if a clairvoyant viewer knew a particular transition element was 27.2 seconds long and asked a virtual assistant to advance the content by that much, there would be almost 30 seconds of content that the viewer missed. Details like a change in setting, a significant advancement in time, introducing a new character, foreshadowing a new conflict, and/or a surprise twist might be neglected completely by skipping the transition scene. There exists a need to balance the desires of the audience to keep a good pace and maintain interest with the need to convey necessary story elements and ensure viewers understand the narrative. There exists a need for an interface to ensure audiences see every scene of a program while not giving the impression that time is being wasted with transition scenes.

As discussed herein, systems and methods may insert a transition scene as an overlay over a portion of one or more surrounding scenes. For instance, by playing a transition scene in a window overlaying an adjacent scene, the program may continue its pace with interruption of a "pause scene" while ensuring that the audience sees all the scenes. Again, while this may not be ideal for content creators desiring audiences to view content as it was intended to be seen, balancing some viewers' need for pace and a need to convey all elements of a program's narrative is likely better than losing viewership to boredom or restlessness. As discussed herein, a user interface may improve audience interest and minimize lost scenes.

Some embodiments may utilize a transition engine to perform one or more parts of the systems and methods of determining transition scenes and playing back transition scenes as overlays over one or more surrounding scenes. A transition engine may be, e.g., a part of a content delivery platform or interactive content guidance application, stored and executed by one or more of the processors and memory of a device and/or server such as those depicted in FIGS. 6 and 7. For instance, a transition engine may run on a server of a content delivery platform like a streaming service. A transition engine may run on a component of a television, set-top box, computer, smartphone, tablet, or other device able to access a content delivery network.

A transition engine, generally, may accept three sequential scenes and generate the second scene (e.g., a transition scene) as an overlay over one or more of the first and third scenes. Providing a transition scene as an overlay, e.g., a window or a picture-in-picture, that plays while one of the surrounding scenes plays can minimize time spent on the transition scene and maximize amount of scenes viewed (not skipped). Generally, overlaying a transition scene may be performed anytime before playback of the scene immediately prior to the transition scene, e.g., so that an overlay may be prepared. In some embodiments, overlaying a transition scene may occur at (or right before) the transition scene, and the following scene is prepared for playback with the overlay of the transition scene. Generally, positioning of the transition scene overlay may be made to be as unobtrusive as possible. In some embodiments, positioning of the transition scene overlay may indicate whether the transition scene occurs before or after the simultaneously played-back scene. For instance, if a transition scene occurs after a scene, but is being played simultaneously with a prior scene, the overlay window may appear on the far right of the screen to indicate that the transition comes after the current scene. If a transition scene occurs before a scene it is being played with, the overlay window may appear on the far left of the screen to indicate the transition is prior to the current scene being played back. In some embodiments, an overlay may move across the screen during one or more scenes to signal progress, e.g., from left to right. Such movement may indicate the transition scene would normally be played back when the window hits a specific point (e.g., the exact middle or all the way to one side).

A transition engine may determine when a transition scene is coming up. A transition engine may receive content with three sequential scenes A, B, and C, where scene B is a transition scene between scene A and scene C. As a transition scene (or pause scene), scene B may be considered boring to some viewers. For instance, scene B may not include any action or dialogue and may only include quiet footage of a car traveling down a road, e.g., signifying a change in setting. A transition engine may access data describing each of scenes A-C. The transition engine determines if scene B is a transition scene. In some embodiments, a transition engine may access metadata for each scene. In some embodiments, a transition engine may access a manifest file for streaming content and the manifest may comprise data describing each of scenes A-C. For instance, the metadata or manifest may identify transition scenes (e.g., scene B) based on identification by a creator, producer, host, critic, crowdsourced group of viewers, etc. A manifest may include other information and may be programmed to include, e.g., transition-scene identifiers. For instance, the received content may include a streaming manifest with XML code identifying a plurality of scenes and which scenes are transition scenes. Using a manifest's XML code identifying transition scenes, some embodiments may take three scenes at a time from the content, with the middle scene being a transition scene. In some embodiments, a transition engine may determine if scene B is a transition scene based on measures of audio levels or interpreting subtitles/captions to detect dialogue. In some cases, a transition engine may determine if scene B is a transition scene or pause scene based on, e.g., a trained predictive model and/or a neural network.

A transition engine must also identify when and where to produce the transition scene as an overlay. For instance, a transition engine may have to determine coordinates of acceptable and/or unacceptable locations to place an overlay. Available zones of a screen may be, e.g., read from a streaming video manifest file. Such zones may be defined by content producers or distributors. A transition engine may render different sizes of windows for transition scene overlays. As for when a transition engine may initiate display an overlay, a transition scene overlay may be played as an overlay so that the end of the current scene coincides. For instance, scene B may be 27 seconds and scene A may be 94 seconds long, so scene A would play back without overlay for 67 seconds and then scene B would overlay for the final 27 seconds. In some embodiments, a transition scene may be sped up. In some embodiments, a transition scene overlay played with a scene may begin at the same time, e.g., if played with a latter scene in a sequence. For instance, if scene B is overlaying scene C, the two may begin at substantially the same time. In some embodiments, scene B may overlay a portion of scene A and a portion of scene C. In some cases, scene B may begin as an overlay so that half the time (or another proportion) may be spent overlaying scene A and the remainder over part of scene C. In some embodiments, a longer portion of scene B may overlay scene A because overlaying scene C might obscure important parts of the content. In some embodiments, e.g., in order to minimize obscuring portions of content, scene B overlaying portions of scenes A and C may be shifted in time, moved in location, and/or sped up (or slowed down for some portions).

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 5B depicts an illustrative flowchart of a process for determining a transition scene, in accordance with some embodiments of the disclosure;

FIG. 5C depicts an illustrative flowchart of a process for determining a transition scene, in accordance with some embodiments of the disclosure;

FIG. 5D depicts an illustrative flowchart of a process for determining a screen position for overlays, in accordance with some embodiments of the disclosure;

FIG. 5F depicts an illustrative flow diagram of a process for providing content with a manifest, in accordance with some embodiments of the disclosure;

DETAILED DESCRIPTION

Figure 1:
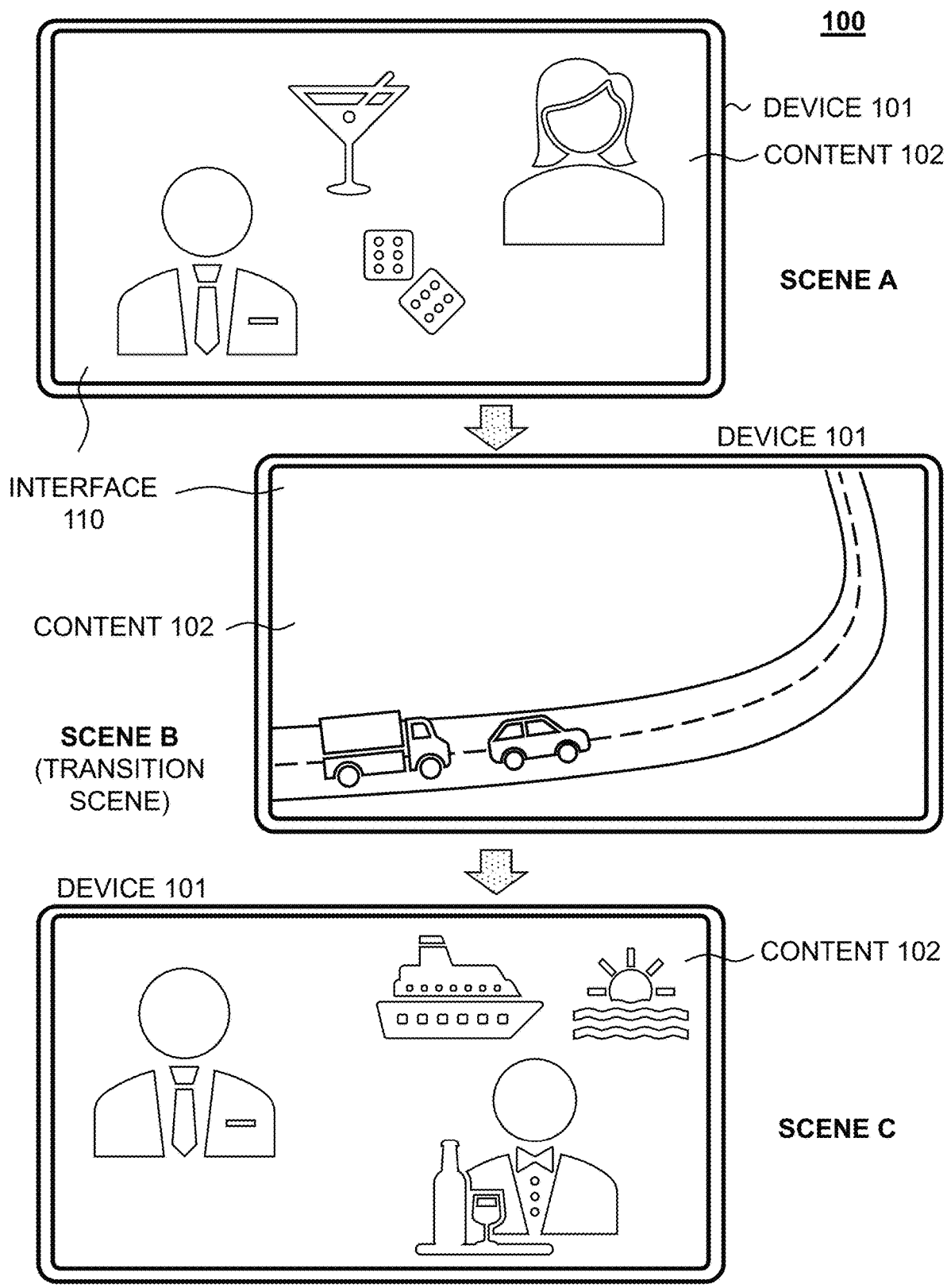
FIG. 1 depicts an illustrative user interface providing three scenes from a content item, in accordance with some embodiments of the disclosure.

Systems and methods are described for providing a user interface configured to provide a "transition" or "pause" scene as an overlay to at least one surrounding scene. In the following description, numerous specific details are set forth to provide thorough explanation of embodiments of the present invention. The terms "transition scene," "pause scene," "transition element," and "pause element" may be used interchangeably throughout. In some embodiments, consecutive transition scenes may be treated as a single transition scene, together. It will be apparent, however, to one skilled in the art, that embodiments of the present invention may be practiced without these specific details. In other instances, some components, structures, and techniques may not be shown in detail in order not to obscure the understanding of this description.

Devices may be designed to facilitate content consumption. Content like video, animation, music, audiobooks, ebooks, playlists, podcasts, images, slideshows, games, text, and other media may be consumed by users at any time, as well as nearly in any place. Abilities of devices to provide content to a content consumer are often enhanced with the utilization of advanced hardware with increased memory and fast processors in devices, e.g., televisions, computers, smartphones, tablets, video game consoles, and other internet-enabled appliances.

An interactive guidance application may be provided for content available via a television, or through one or more devices, and applications may bring together content available both through a television and through internet-connected devices. Interactive content guidance applications may take various forms, such as interactive television program guides, electronic program guides and/or user interfaces, which may allow users to navigate among and locate many types of content including conventional television programming (provided via broadcast, cable, fiber optics, satellite, internet (IPTV), or other means) and recorded programs (e.g., DVRs) as well as pay-per-view programs, on-demand programs (e.g., video-on-demand systems), internet content (e.g., streaming media, downloadable content, webcasts, shared social media content, etc.), music, audiobooks, websites, animations, podcasts, (video) blogs, ebooks, and/or other types of media and content.

Content guidance applications may be provided as online applications (e.g., provided on a website), or as stand-alone applications or clients on handheld computers, mobile telephones, or other mobile devices. Various devices and platforms that may implement content guidance applications are described in more detail below.

Media devices, content delivery systems, and interactive content guidance applications may utilize input from various sources including remote controls, keyboards, microphones, video and motion capture, touchscreens, and others. For instance, a remote control may use a Bluetooth connection to a television or set-top box to transmit signals to move a cursor. A connected keyboard or other device may transmit input data, via, e.g., infrared or Bluetooth, to a television or set-top box. A remote control may transmit voice data, captured by a microphone, to a television or set-top box. Voice recognition systems and virtual assistants connected with televisions or devices may be used to search for and/or control playback of content to be consumed. Finding, selecting, and presenting content is not necessarily the end of providing content for consumption by an audience. Controlling playback should be accessible and straightforward.

Trick-play (or trick mode) is a feature set for digital content systems, such as DVR or VOD, to facilitate time manipulation of content playback with functions like pause, fast-forward, rewind, and other playback adjustments and speed changes. Trick-play features typically function with interactive content guidance applications or other user interfaces. Some content playback systems utilize metadata that may divide content into tracks, scenes, and/or chapters to perform a "next-track" or "previous-track" command at a push of a button. Some content playback systems mimic functions of analogue systems and play snippets or images while "fast-forwarding" or "rewinding" digital content. Along with fast-forward at multiple, various speeds, systems may include a "skip-ahead" function to jump ahead, e.g., 10, 15, or 30 seconds, in content to allow skipping of a commercial or redundant content. Along with rewind at multiple, various speeds, systems may include a "go-back" or "replay" function that would skip backwards, e.g., 10, 15, or 30 seconds, in content to allow a replay.

Manipulating playback of content may be caused by input based on remote control, mouse, touch, gesture, voice or various other input. Performing trick-play functions has traditionally been via remote control—e.g., a signal caused by a button-press of a remote control. Functions may be performed via manipulation of a touchscreen, such as sliding adjustment of a guide bar to affect playback time and enable replay or skip-ahead functions. Voice recognition systems and connected virtual assistants may allow other playback functions as such systems may not be limited. For instance, some systems may adjust playback of a content item by a precise time when a voice assistant is asked to "fast-forward for 17 seconds" or "skip ahead 3 minutes."

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

In the following description and claims, the terms "transition scene" and "pause scene" may be used interchangeably and may refer to scenes within programs or content that are not considered plot-necessary. A transition scene may refer to, for instance, a scene only depicting a change of setting and/or time. A transition scene may also refer to, for instance, a scene lacking dialogue, action, characters, and/or sound. A transition scene may also refer to, for instance, a boring or dull scene with no action. A scene may be designated as a "transition scene" by the content provider, host, distributor, producer, director, author, artist, critics, and/or crowdsourcing. A transition scene identified may be stored as, e.g., metadata and/or a streaming manifest file.

FIG. 1 depicts an illustrative user interface providing three scenes from a content item, in accordance with some embodiments of the disclosure. Scenario 100 of FIG. 1 illustrates a user interface, interface 110, of an interactive content guidance application presenting content 102. Scenario 100 of FIG. 1 illustrates three scenes, e.g., scene A, scene B, and scene C of content 102 provided by interface 110.

Interface 110 depicts providing content 102 for consumption via interface 110 on device 101. Content 102 may be any media that can be divided into segments/scenes for visual playback, e.g., film, TV show, video, animation, multimedia ebooks, playlists, podcasts, slideshows, games, etc. For instance, content 102 may be a film that a viewer is watching on device 101, e.g., a spy film involving gambling (scene A), truck transportation (scene B), and a cruise (scene C). Device 101 may be, for instance, a television, set-top box, computer, smartphone, tablet, or other device able to access a content delivery network that provides interface 110 and content 102. Interface 110 may be a part of a content delivery platform or interactive content guidance application, stored and executed by one or more of the processors and memory of a device and/or server such as those depicted in FIGS. 6 and 7. Content 102 may be delivered via a content delivery system using one or more of cable, fiber, satellite, antenna, streaming over IP, wireless, or other content delivery methods. In some embodiments, content 102 may be captured live for live broadcast and/or streaming.

In scenario 100 of FIG. 1, content 102 comprises a plurality of scenes in sequence. For instance, content 102 may be a spy movie comprising, at least, three scenes. In some embodiments, three scenes may be analyzed at a time to determine if any of the scenes comprise a "transition scene" or "pause scene." For instance, content 102 may be a film that a viewer is watching on device 101, e.g., a spy film involving gambling (scene A), truck transportation (scene B), and a cruise (scene C). In scenario 100, scene B, depicted as a truck and a car driving on a road, may be considered a transition scene. Such a transition scene (e.g., scene B) may be used to break up scene A and scene C. In some cases, a transition scene may convey a change in time or setting. Generally, a transition scene, such as scene B, is considered boring but tolerated by viewers as a potentially important detail in the storytelling process.

Not everyone enjoys a transition scene. Watching a spy movie may be exciting and capture a viewer's attention; however, certain scenes may be too slow or dull for certain viewers. For instance, younger viewers may not appreciate scenes without action. In some cases, those viewing the film outside of a theater, e.g., on a mobile device while travelling or even at home with other distractions around, may have difficulty keeping focus with some of the slower scenes. Some embodiments may detect certain scenes as transition scenes, such as scene B of scenario 100.

Figure 5A:
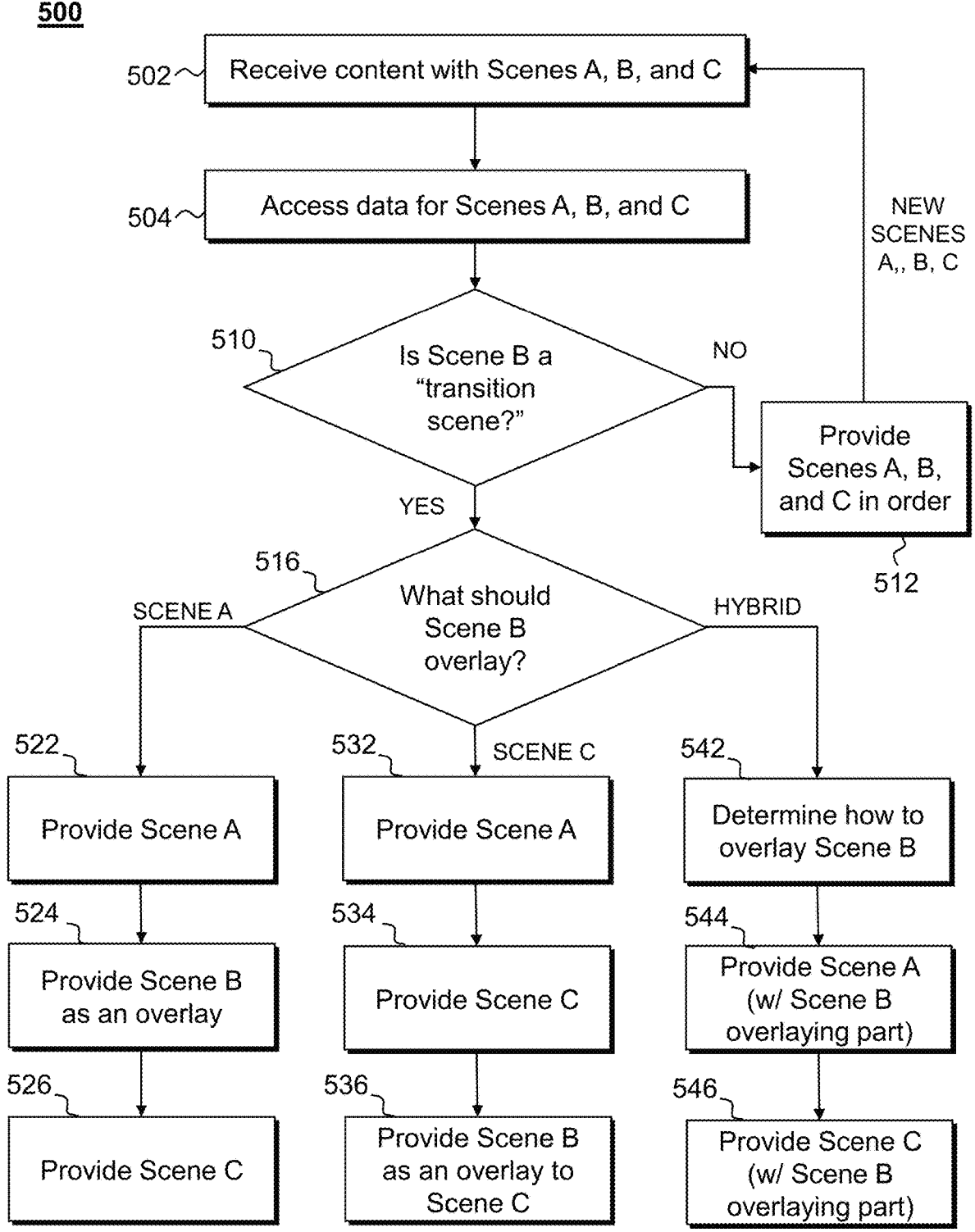
FIG. 5A depicts an illustrative flowchart of a process for providing three scenes from a content item, in accordance with some embodiments of the disclosure.
Figure 5E:
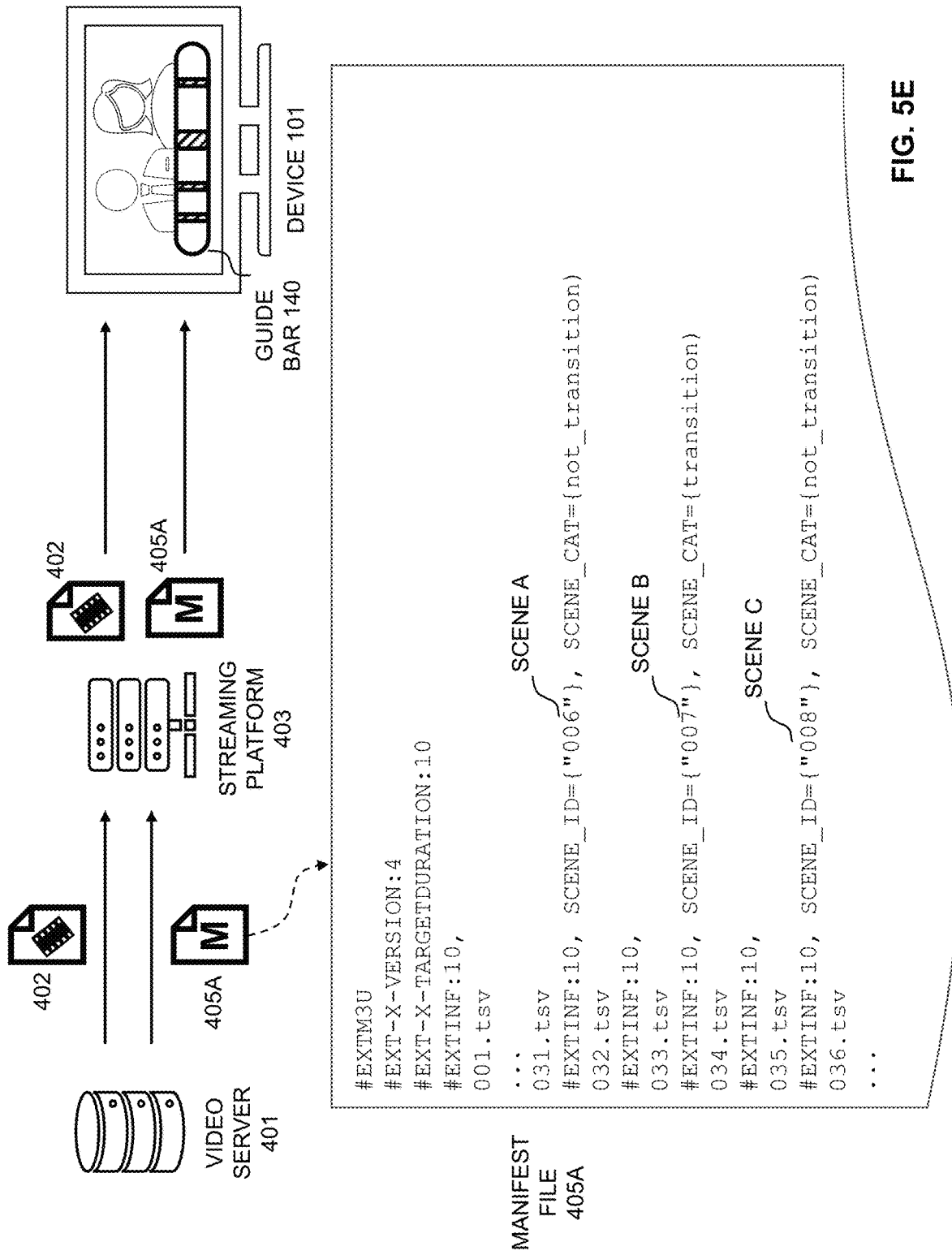
FIG. 5E depicts an illustrative flow diagram of a process for providing content with a manifest, in accordance with some embodiments of the disclosure.
Figure 5G:
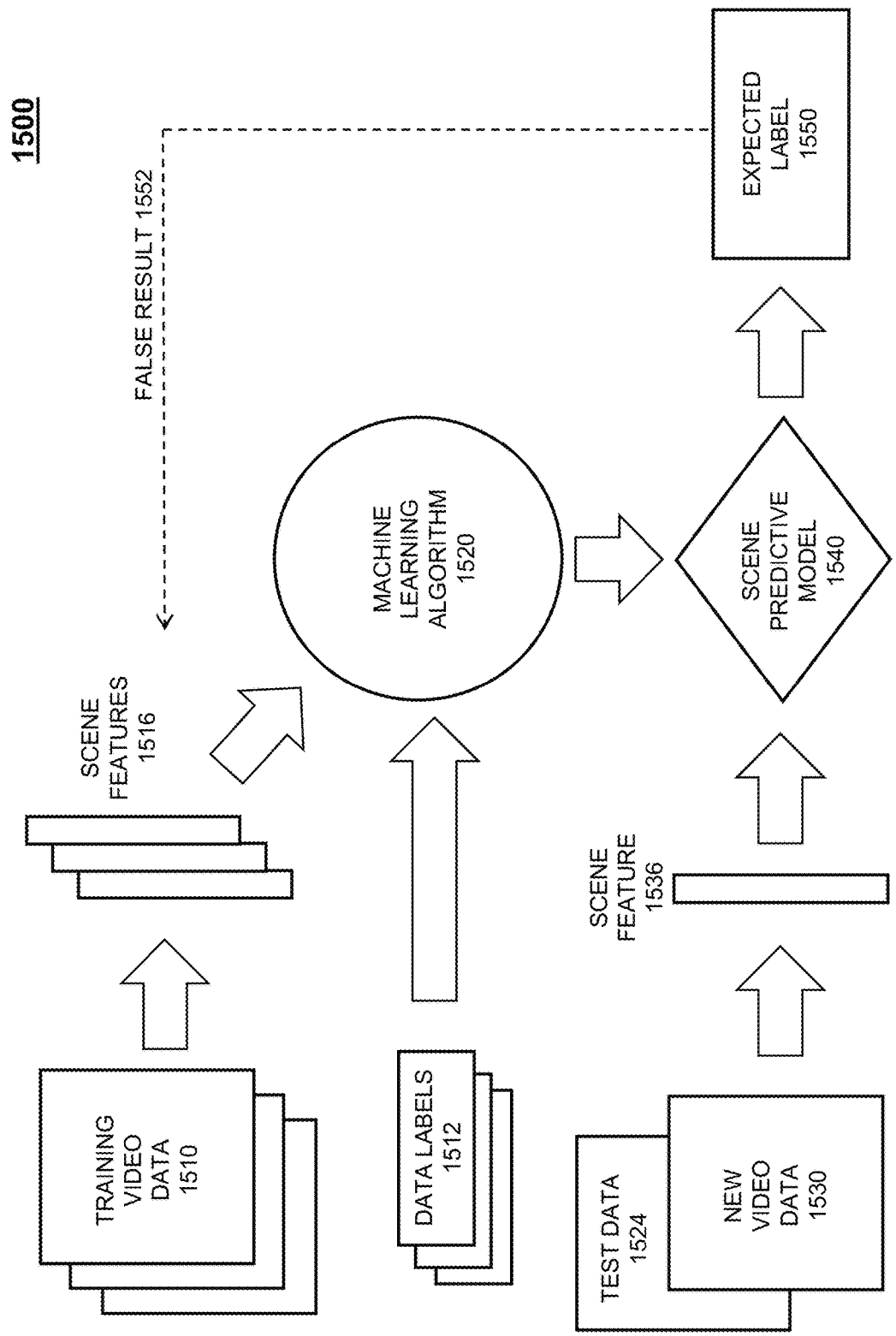
FIG. 5G depicts an illustrative flow diagram of a process for training a machine learning model to determine transition scenes, in accordance with some embodiments of the disclosure.
Figure 6:
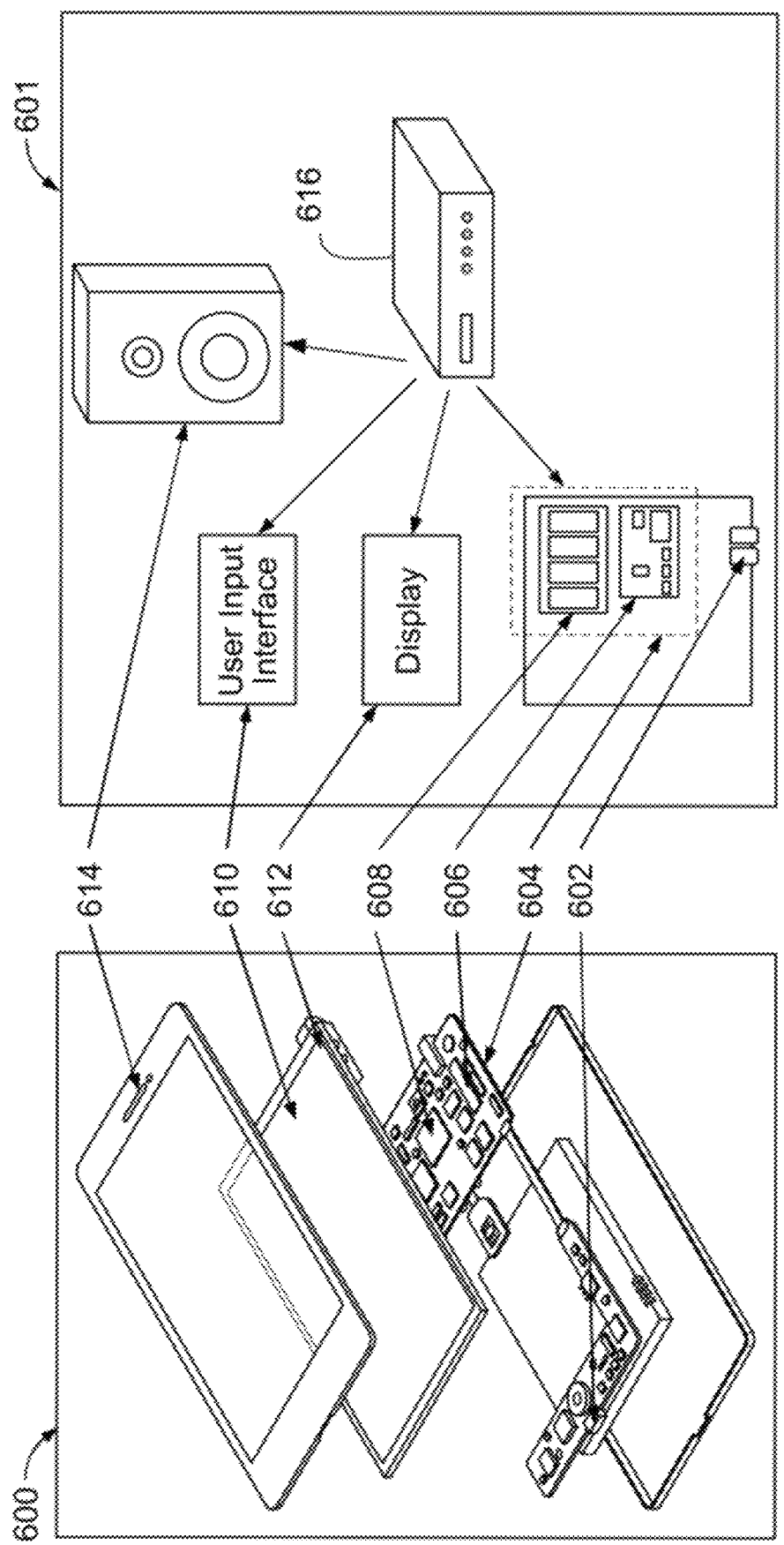
FIG. 6 is a diagram of illustrative devices, in accordance with some embodiments of the disclosure.
Figure 7:
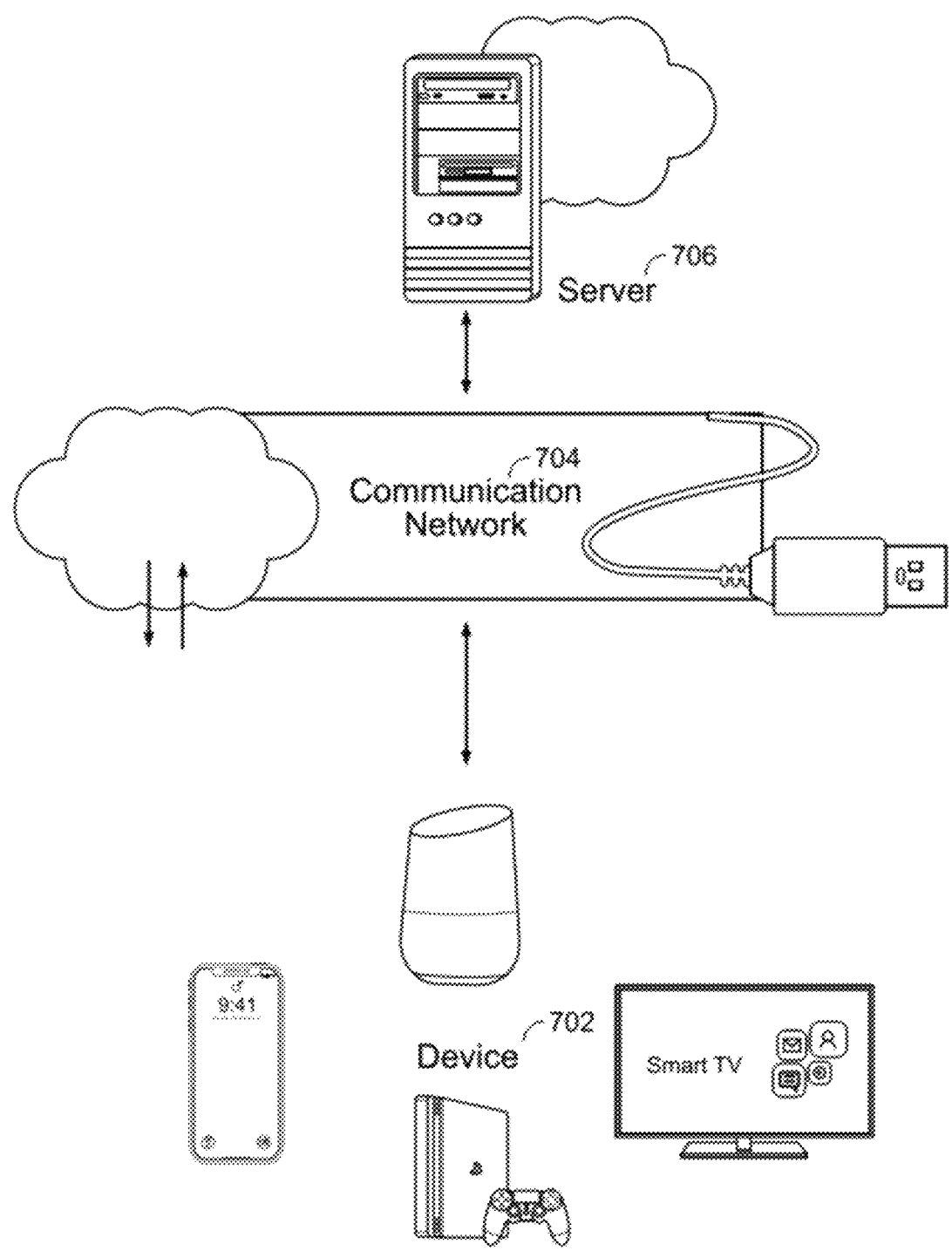
FIG. 7 is a diagram of an illustrative system, in accordance with some embodiments of the disclosure.

Exemplary processes such as determining a transition scene and providing three scenes from a content item, e.g., described by process 500 of FIG. 5, may be carried out by a transition engine, e.g., as part of a content delivery platform or interactive content guidance application, stored and executed by one or more of the processors and memory of a device and/or server such as device 101 and devices depicted in FIGS. 6 and 7. In some embodiments, a "transition mode" may be enabled to allow a transition engine to detect and/or modify transition scenes.

Figure 2:
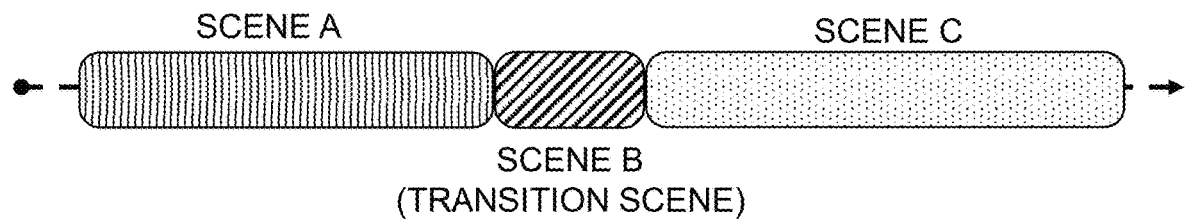
FIG. 2 depicts illustrative timelines for providing three scenes from a content item, in accordance with some embodiments of the disclosure.
Figure 2:
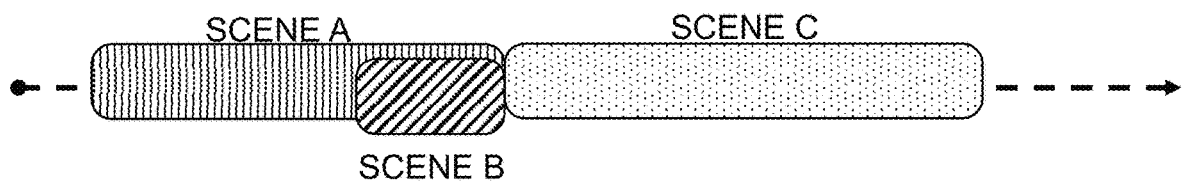
Figure 2:
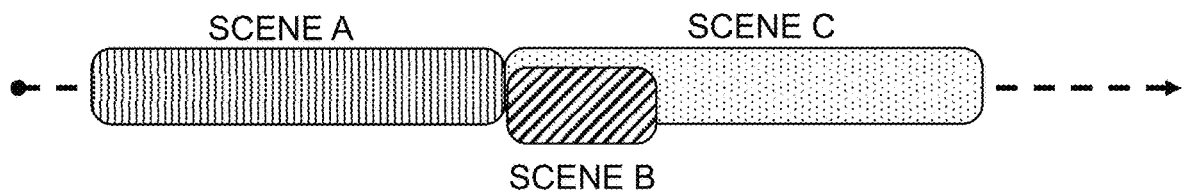
Figure 2:
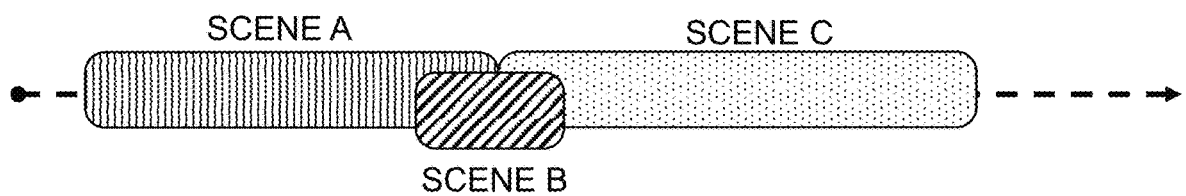

FIG. 2 depicts illustrative timelines for providing three scenes from a content item, in accordance with some embodiments of the disclosure. For instance, each of scenarios 200, 202, 203, and 204 depicts three consecutive scenes and proposed timelines of viewing (e.g., including overlap). Each of scenes A-C may be considered a sequential scene from scenario 100, e.g., a spy film involving gambling (scene A), truck transportation (scene B), and a cruise (scene C).

In scenario 200 of FIG. 2, scenes A, B, and C are provided in order and use the full amount of runtime of all three scenes. Scenario 100 of FIG. 1 follows the timeline of scenario 200 from FIG. 2.

In scenario 202 of FIG. 2, scenes A and B are provided together before scene C is provided, and playback of scenes A-C has a duration equal to the runtime of scene A and scene C played back in order. For instance, scene B may be provided as an overlay of scene A, during the latter portion of scene A, prior to scene C. Scenario 300 of FIG. 3A follows the timeline of scenario 202 from FIG. 2.

In scenario 203 of FIG. 2, scenes B and C are provided together after scene A is provided, and playback of scenes A-C has a duration equal to the runtime of scene A and scene C played back in order. For instance, scene B may be provided as an overlay of scene C, during the initial portion of scene C, after playback of scene A. Scenario 350 of FIG. 3B follows the timeline of scenario 203 from FIG. 2.

In scenario 204 of FIG. 2, scene B is provided during portions of each of scene A and scene C, and playback of scenes A-C has a duration equal to the runtime of scene A and scene C played back in order. For instance, a first portion of scene B may be provided as an overlay of the latter portion of scene A and the latter portion of scene B may be provided as an overlay of the initial portion of scene C, e.g., after playback of scene A. Scenario 400 of FIG. 4A follows the timeline of scenario 204 from FIG. 2.

Figure 3A:
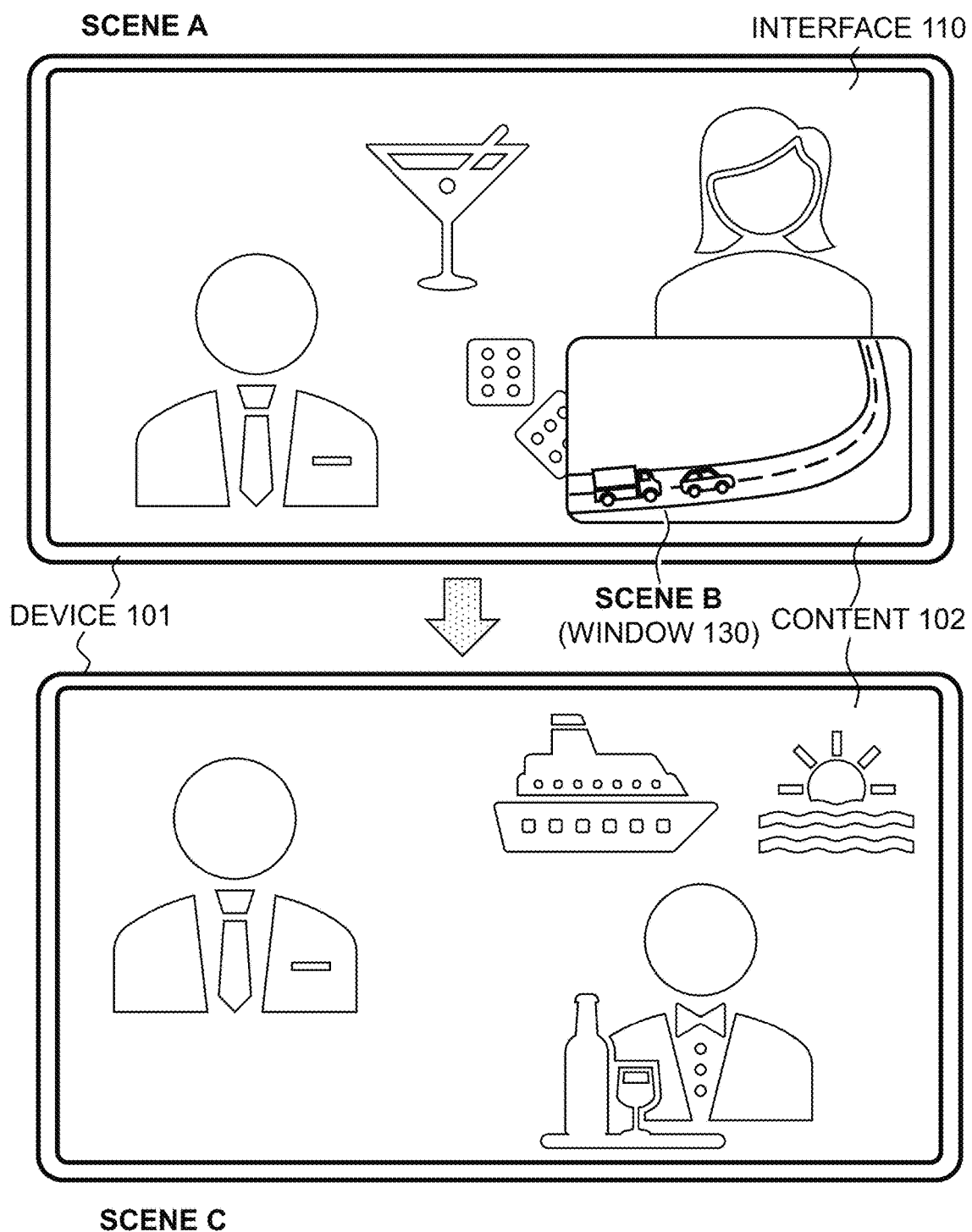
FIG. 3A depicts an illustrative user interface providing three scenes from a content item, in accordance with some embodiments of the disclosure.

FIG. 3A depicts an illustrative user interface providing three scenes from a content item, in accordance with some embodiments of the disclosure. Scenario 300 of FIG. 3A illustrates interface 110 of an interactive content guidance application presenting content 102. Scenario 300 of FIG. 3A also illustrates interface 110 overlaying scene B over a portion of the display of scene A before playing scene C.

In scenario 300, interface 110 depicts providing content 102 for consumption via interface 110 on device 101. Like scenario 100, content 102 may be, e.g., a spy film involving gambling (scene A), truck transportation (scene B), and a cruise (scene C). In scenario 300, scene B, depicted as a truck and a car driving on a road in window 130, may be considered a transition scene. In some embodiments, interface 110 may determine if scene B is a transition scene and place scene B in overlay window 130 for playback during another scene.

In scenario 300, window 130 overlays scene A. For instance, interface 110 may receive content with consecutive scenes A, B, and C, determine that scene B is a transition scene, and place scene B as an overlay over (part of) scene A before playing back scene C. Scene B, for instance, may be played back in full within a split screen or a small window. In some embodiments, scene B may be sped up (or slowed down, e.g., to ensure a detail is seen). In some embodiments, scene B may have full or reduced volume. In some embodiments, scene B may be muted. In some embodiments, scene B may have captions, e.g., if there is some dialogue, narration, and/or sounds.

Interface 110 may provide window 130 at various locations and in various sizes. For instance, scenario 300 depicts window 130 as a picture-in-picture overlay in the bottom right zone of the screen. In some embodiments, placement of window 130 may be based on whether scene B comes before or after the scene it overlays. For instance, a window overlaying the right side of the screen may indicate to a viewer that the transition scene typically occurs after playback of the larger scene (e.g., as depicted in scenario 300 of FIG. 3A) and a window overlaying the left side may indicate to a viewer that the transition scene typically occurs before playback of the larger scene (e.g., as depicted in scenario 350 of FIG. 3B). In some embodiments, placement of window 130 may be based on available screen zones, e.g., interface 110 choosing a section of the screen to minimize covering of characters or action (e.g., scenario 450 of FIG. 4B).

In some embodiments, playback of scene B may begin at various times throughout playback of scenes A and/or C. In scenario 300, playback of scene B is coordinated to finish at (or near) the end of scene A.

Figure 3B:
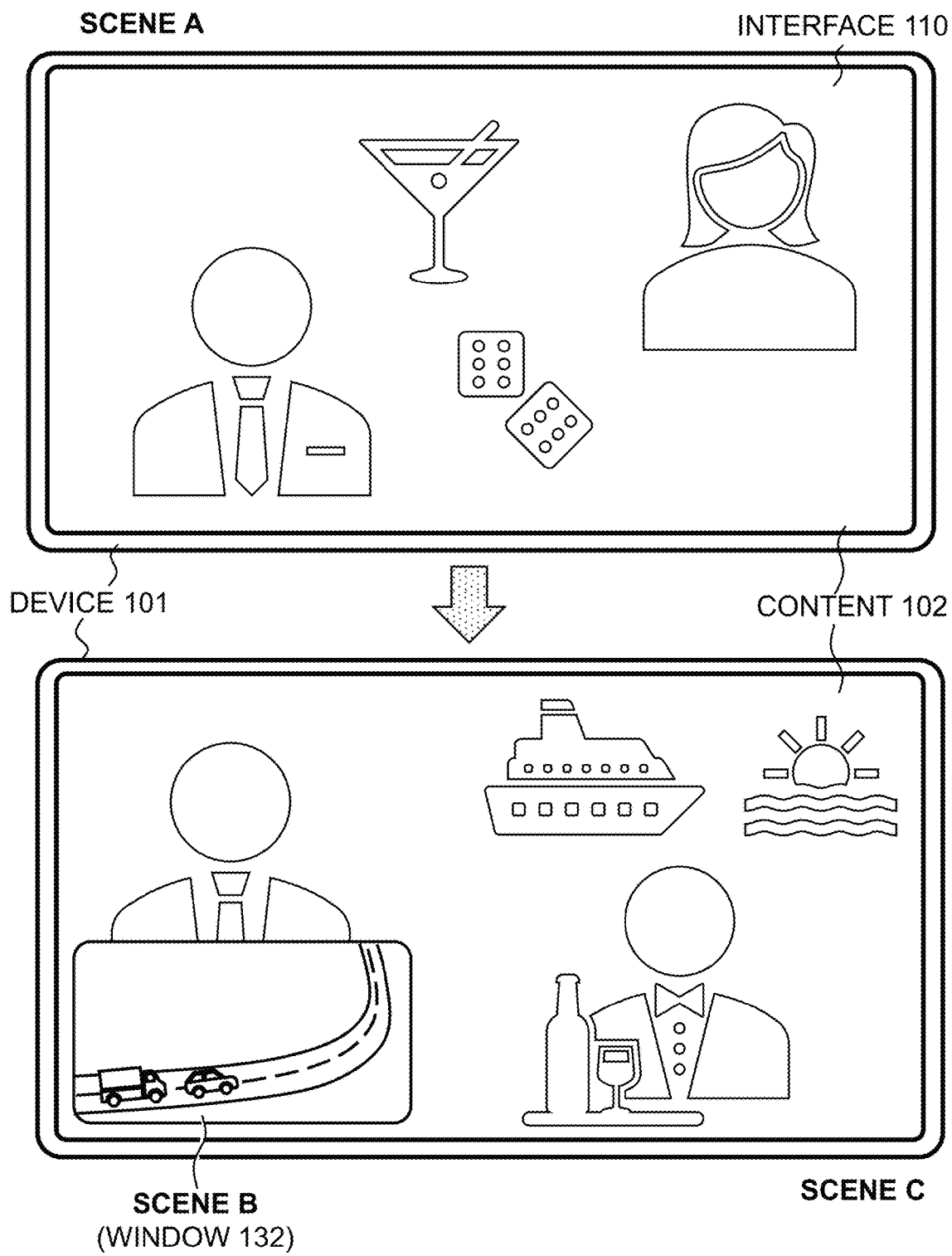
FIG. 3B depicts an illustrative user interface providing three scenes from a content item, in accordance with some embodiments of the disclosure.

FIG. 3B depicts an illustrative user interface providing three scenes from a content item, in accordance with some embodiments of the disclosure. Scenario 350 of FIG. 3B illustrates interface 110 presenting content 102. Scenario 350 of FIG. 3B also illustrates interface 110 overlaying scene B over a portion of the display of scene C after playing scene A.

In scenario 350, scene B, depicted as a truck and a car driving on a road in window 130, may be considered a transition scene between scenes A and C. In some embodiments, interface 110 may determine if scene B is a transition scene and place scene B in overlay window 132 for playback during another scene. In scenario 350, window 132 overlays scene C. For instance, interface 110 may receive content with consecutive scenes A, B, and C, determine that scene B is a transition scene, and place scene B as an overlay over (part of) scene C after playing back scene A. Scene B, for instance, may be played back in full within a split screen or a small window.

Interface 110 may provide window 132 at various locations and in various sizes. For instance, scenario 350 depicts window 132 as a picture-in-picture overlay in the bottom left zone of the screen. In some embodiments, placement of window 132 may be based on whether scene B comes before or after the scene it overlays. For instance, a window overlaying the left side may indicate to a viewer that the transition scene typically occurs before playback of the larger scene (e.g., as depicted in scenario 350 of FIG. 3B). In some embodiments, placement of window 132 may be based on available screen positions (e.g., scenario 450 of FIG. 4B).

In some embodiments, playback of scene B may begin at various times throughout playback of scenes A and/or C. In scenario 350, playback of scene B is coordinated to start after playback of scene A and with (or near the) beginning of playback of scene C.

Figure 4A:
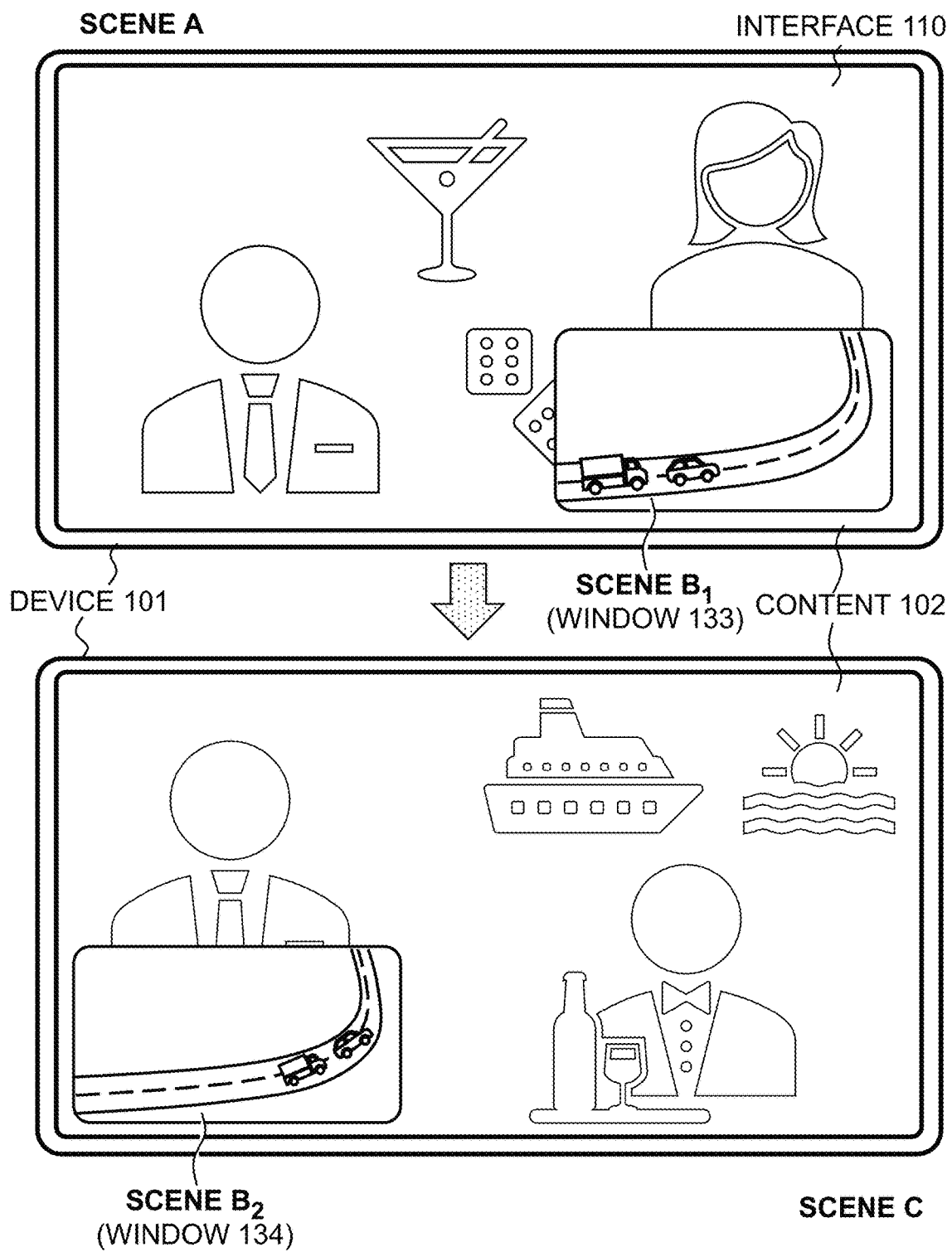
FIG. 4A depicts an illustrative user interface providing three scenes from a content item, in accordance with some embodiments of the disclosure.

FIG. 4A depicts an illustrative user interface providing three scenes from a content item, in accordance with some embodiments of the disclosure. Scenario 400 of FIG. 4A illustrates interface 110 presenting content 102. Scenario 400 of FIG. 4A also illustrates interface 110 overlaying scene B over a portion of the display of scenes A and C.

In scenario 400, scene B, depicted as two parts ($B_1$ and $B_2$) featuring a truck and a car driving on a road in windows 133 and 134, may be considered a transition scene between scenes A and C. In some embodiments, interface 110 may determine if scene B is a transition scene and place scenes $B_1$ and $B_2$ in overlay windows 133 and 134, respectively, for playback during other scenes. In scenario 400, window 133 overlays scene A and window 134 overlays scene C. For instance, interface 110 may receive content with consecutive scenes A, B (made up of $B_1$ and $B_2$), and C, determine that scene B is a transition scene, and place scene $B_1$ (e.g., the first portion of scene B) as an overlay over part of scene A and place scene $B_2$ (e.g., the second portion of scene B) over part of scene C, after playing back scene A with scene $B_1$. Each of scenes $B_1$ and $B_2$, for instance, may be played back in full within a split screen or a small window.

In scenario 400, for instance, scene B may be split into scenes $B_1$ and $B_2$ in various ways. In some embodiments, interface 110 may split scene B in half or based on some other proportion. In some embodiments, interface 110 may split scene B based on one or more runtimes of scenes A-C, e.g., in order to fit scene B in timewise. In some embodiments, interface 110 may split scene B based on metadata and/or instructions in a manifest file. In some embodiments, interface 110 may split scene B so that important parts of scenes A and/or C are not obscured.

Interface 110 may provide windows 133 and 134 at various locations and in various sizes. For instance, scenario 400 depicts window 133 as a picture-in-picture overlay in the bottom right zone of the screen and depicts window 134 as a picture-in-picture overlay in the bottom left zone of the screen. In some embodiments, placement of windows 133 and 134 may be based on whether scene B comes before or after the scene it overlays. For instance, window 133 overlaying the right side may indicate to a viewer that the transition scene (scene B) typically occurs before playback of the larger scene (scene A), and window 134 overlaying the left side may indicate to a viewer that the transition scene (scene B) typically occurs before playback of the larger scene (scene C). In some embodiments, placement of window 132 may be based on available screen positions (e.g., as in scenario 450 of FIG. 4B).

In some embodiments, playback of scene B may begin at various times throughout playback of scenes A and/or C. In scenario 350, playback of scene B is coordinated to start after playback of scene A and end with (or near the) beginning of playback of scene C.

Figure 4B:
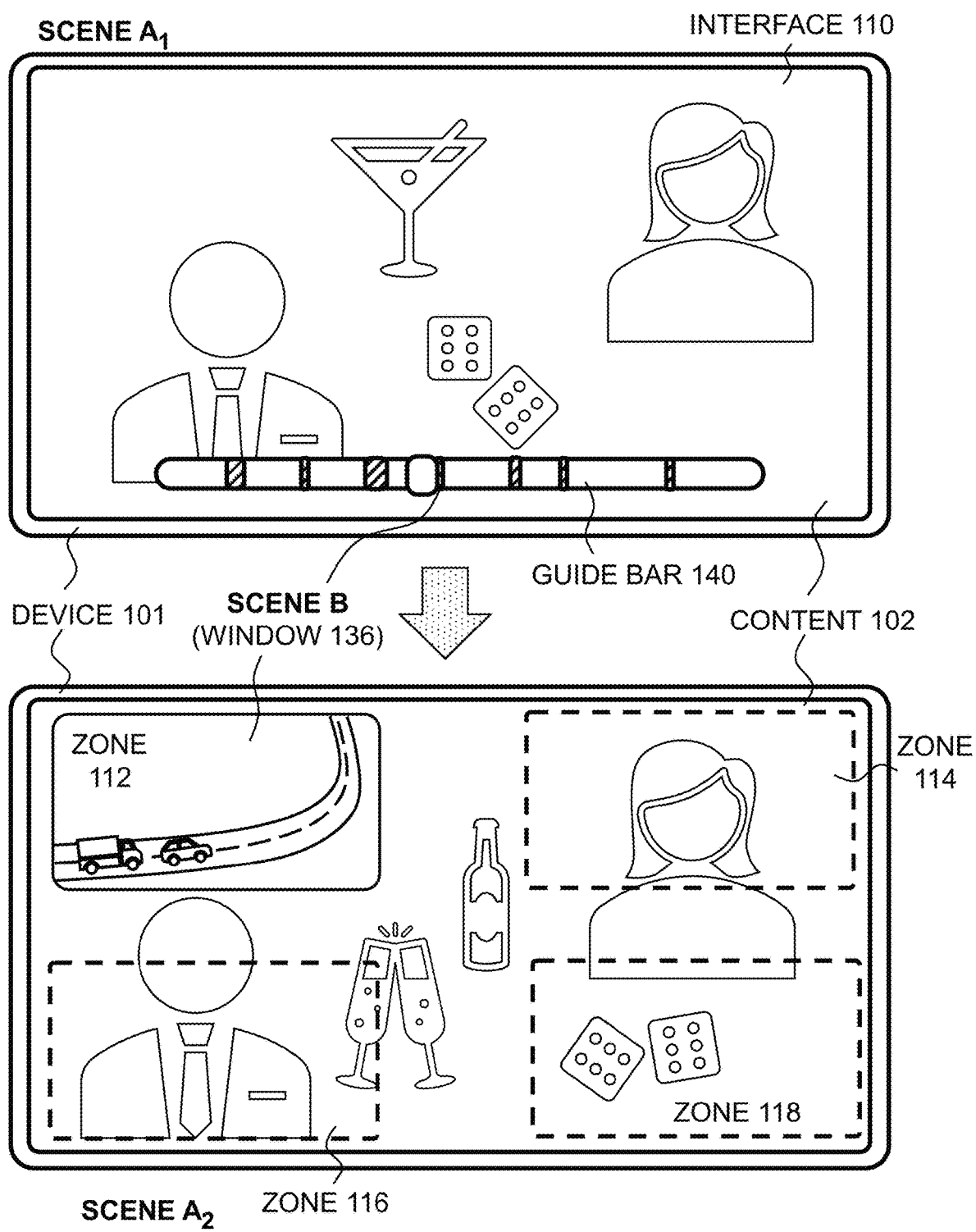
FIG. 4B depicts an illustrative user interface providing an overlay scene, in accordance with some embodiments of the disclosure.

FIG. 4B depicts an illustrative user interface providing an overlay scene, in accordance with some embodiments of the disclosure. Scenario 450 of FIG. 4B illustrates a user interface, interface 110, of an interactive content guidance application presenting content 102. Scenario 450 of FIG. 4B also illustrates interface 110 determining a screen position for scene B to overlay scene A.

In scenario 450, interface 110 depicts providing content 102 for consumption via interface 110 on device 101. Like prior scenarios, content 102 may be, e.g., a spy film involving gambling (scene A, depicted as parts, e.g., $A_1$ and $A_2$) and a truck transportation (scene B). In scenario 450, scene B, depicted as a truck and a car driving on a road in window 136, may be considered a transition scene. In some embodiments, interface 110 may determine if scene B is a transition scene and place scene B in overlay window 136 for playback during another scene, e.g., scene A. In scenario 450, interface 110 depicts guide bar 140 which includes transition scenes marked on guide bar 140. Scene B is identified on guide bar 140. In some embodiments, the transition scenes marked on guide bar 140 may be populated by metadata and/or a manifest file associated with content 102. In some embodiments, the transition scenes marked on guide bar 140 may be populated by detection of a lack of dialogue or narration based on measures of audio levels and/or captions.

In scenario 450, window 136 overlays scene $A_2$. For instance, interface 110 may receive content with consecutive scenes A and B (and maybe C), determine that scene B is a transition scene, and place scene B as an overlay over a second part of scene A (e.g., $A_2$). In some embodiments, as interface 110 plays back scene $A_1$, e.g., the first portion of scene A, window 136 is generated as an overlay and scene B is presented as a picture-in-picture window over part of scene $A_2$, e.g., the latter portion of scene A. Scene B, for instance, may be played back in full within a split screen or a small window. In some embodiments, scene B may be sped up (or slowed down, e.g., to ensure a detail is seen). In some embodiments, scene B may have full or reduced volume. In some embodiments, scene B may be muted. In some embodiments, scene B may have captions, e.g., if there is some dialogue, narration, and/or sounds.

Interface 110 may provide window 136 at various locations and in various sizes. For instance, scenario 450 depicts window 136 as a picture-in-picture overlay in the top left zone of the screen. In some embodiments, placement of window 136 may be based on available screen zones, e.g., interface 110 choosing a section of the screen to minimize covering of characters or action. For instance, in scenario 450 of FIG. 4B, zones 112 (top left), 114 (top right), 116 (bottom left), and 118 (bottom right) may be used for an overlay window. Some embodiments may choose a zone based on whether a particular area may obscure any content features. In scenario 450, zone 112 (top left) is chosen so not to obscure either characters or an activity (e.g., dice roll). Some embodiments may choose a zone based on metadata or a manifest file identifying available zones and/or zones with characters/activities that should not be obscured.

In some embodiments, playback of scene B may begin at various times throughout playback of scene A. In scenario 450, playback of scene B is coordinated to start after scene $A_1$ is played and to play (nearly) contemporaneously with scene $A_2$. For instance, scenes $A_1$ and $A_2$ may be split as parts of scene A so that scene $A_2$ coincides temporally with playing scene B as an overlay, e.g., before scene C.

FIG. 5A depicts an illustrative flowchart of a process for providing three scenes from a content item, in accordance with some embodiments of the disclosure. There are many ways to provide a transition scene as an overlay, and process 500 of FIG. 5A is an exemplary method to identify a transition scene and determine when/where to overlay the transition scene. For instance, process 500 may accept any three consecutive scenes from a content item as input, determine if the middle scene is a transition scene, and decide how to overlay the transition scene over the first or the third scene. Some embodiments may utilize a transition engine to perform one or more parts of process 500, e.g., as part of a content delivery platform or interactive content guidance application, stored and executed by one or more of the processors and memory of a device and/or server such as those depicted in FIGS. 6 and 7.

At step 502, a transition engine receives content with scenes A, B, and C. In process 500, scenes A, B, and C are sequential and may be any three consecutive scenes from a content item. For instance, the content may be a spy movie comprising, at least, three scenes, e.g., gambling (scene A), truck transportation (scene B), and a cruise (scene C) as depicted in FIG. 1. In some embodiments, such a content item may be received via network, e.g., as depicted in FIG. 7.

At step 504, the transition engine accesses data for scenes A, B, and C. Content typically includes metadata. In some cases, metadata associated with the content may be accessed or transmitted and interpreted to identify a transition scene. In some embodiments, metadata associated with the received content may identify a transition scene. In some cases, metadata associated with the content may be accessed or transmitted and interpreted to find transition scene identification information. In some embodiments, metadata associated with the received content may identify a region or screen coordinates where an overlay should or should not appear on screen. In some embodiments, metadata can be programmed to identify where an overlay should not be placed, e.g., zone or coordinates. In some embodiments, streaming content may use a manifest file that may describe available stream segments and respective bit rates. A manifest may act as a playlist for downloading and playing smaller video segments, scenes, or sub-scenes. A manifest may include other information and may be programmed to include, e.g., transition-scene identifiers. For instance, the received content may include a streaming manifest with XML code identifying a plurality of scenes and which scenes are transition scenes. Using a manifest's XML code identifying transition scenes, some embodiments may take three scenes at a time from the content, with the middle scene being a transition scene. A manifest may also include other information about the video and could be programmed to include screen position for overlay window location availability or prohibition. For instance, the received content may include a streaming manifest with XML code identifying the coordinates of a box where a picture-in-picture can be placed without obscuring important characters or action. In some cases, such a box may change position and the metadata or manifest will reflect the change. In some cases, a box may be defined as an off-limits area not permitted to be obscured, e.g., because it might cover a portion of a character's face.

At step 510, the transition engine determines if scene B a transition scene. For instance, the transition engine will detect if scene B comprises a transition scene. For instance, scene B may not include any action or dialogue and may only include quiet footage, e.g., signifying a change in setting. In some embodiments, the transition scenes may be identified by metadata and/or a manifest file associated with content 102. In some embodiments, the transition scenes of a content item may be detected by a lack of dialogue or narration based on, e.g., measures of audio levels and/or captions. In some cases, a transition engine may determine if scene B is a transition scene based on, e.g., a trained predictive model and/or a neural network.

If the transition engine determines scene B is not a transition scene at step 510, then, at step 512, the transition engine provides scenes A, B, and C in order. The transition engine prepares to receive three more consecutive scenes from the content item, e.g., going back to step 502.

If the transition engine determines scene B is a transition scene at step 510, then, at step 516, the transition engine determines what scene(s) should scene B overlay. For example, the transition engine may determine scene B should overlay the prior scene (scene A), the following scene (scene C), or parts of both (e.g., a "hybrid"). Process 570 of FIG. 5D depicts an exemplary process for determining how and/or where scene B should be overlayed.

If the transition engine determines scene B should overlay scene A, the transition engine, at step 522, provides scene A. Then, at step 524, the transition engine provides scene B as an overlay to scene A. Generally, scene B may overlay any portion of scene A. In some embodiments, the transition engine may display scene B as an overlay so that the end of scene A coincides with the end of scene B. For instance, scene B may be 27 seconds and scene A may be 94 seconds long, so scene A would play back without overlay for 67 seconds and then scene B would overlay for the final 27 seconds. Using such an overlay may save time, as depicted in scenario 202 of FIG. 2. In some embodiments, a window overlaying the right side of the screen may indicate to a viewer that the transition scene typically occurs after playback of the larger scene, e.g., as depicted in scenario 300 of FIG. 3A. Once playback of scenes A and B is complete, at step 526, the transition engine provides scene C without an overlay. Then process 500 repeats with new scenes.

If the transition engine determines scene B should overlay scene C, the transition engine, at step 532, provides scene A without overlay. When scene A is complete, at step 534, the transition engine provides scene C. At step 536, scene B is provided as an overlay to scene C. Generally, scene B may overlay any portion of scene C. In some embodiments, the transition engine may display scene B as an overlay so that the beginning of scene C coincides with the beginning of scene B. For instance, if scene B is overlaying scene C, the two may begin at substantially the same time. Using such an overlay may save time as depicted in scenario 203 of FIG. 2. In some embodiments, a window overlaying the left side may indicate to a viewer that the transition scene typically occurs before playback of the larger scene (e.g., as depicted in scenario 350 of FIG. 3B). Once scenes A, B, and C are complete, after step 536, the transition engine prepares to receive new scenes at step 502 again.

If the transition engine determines scene B should overlay both scene A and scene C, the transition engine, at step 542, determines how to overlay part of scene B over a portion of scene A and another part of scene B over a portion of scene C. For instance, scene B may be split into two parts: scene $B_1$ and scene $B_2$. In such a case, scene $B_1$ will overlay part of scene A (step 544) and scene $B_2$ will overlay part of scene C (step 546). In some embodiments, the transition engine may split scene B in half or based on some other proportion. In some embodiments, the transition engine may split scene B based on one or more runtimes of scenes A-C, e.g., in order to fit scene B in timewise. In some embodiments, the transition engine may split scene B based on metadata and/or instructions in a manifest file. In some embodiments, the transition engine may split scene B so that important parts of scenes A and/or C are not obscured.

Generally, scene $B_1$ may overlay any portion of scene A. In some embodiments, the transition engine may display scene $B_1$ as an overlay so that the end of scene A coincides with the end of scene $B_1$. When playback of scene $B_1$ overlaying scene A is complete, at step 544, the transition engine provides scene C. At step 546, scene $B_2$ is provided as an overlay to scene C. Generally, scene $B_2$ may overlay any portion of scene C. In some embodiments, with scene $B_2$ overlaying scene C, the two may begin at substantially the same time. Using such an overlay may save time, as depicted in scenario 204 from FIG. 2. In some embodiments, a window overlaying the left side may indicate to a viewer that the transition scene typically occurs before playback of the larger scene (e.g., as depicted in scenario 350 of FIG. 3B). Once scenes A, B, and C are complete, after step 546, the transition engine prepares to receive new scenes and process 500 repeats.

FIG. 5B depicts an illustrative flowchart of a process for determining a transition scene, in accordance with some embodiments of the disclosure. There are many ways to determine a transition scene, and process 550 of FIG. 5B is an exemplary method. Some embodiments may utilize a transition engine to perform one or more parts of process 550, e.g., as part of a content delivery platform or interactive content guidance application.

At step 552, the transition engine receives content with scenes A, B, and C. In process 550, scenes A, B, and C are sequential and may be any three consecutive scenes from a content item.

At step 554, the transition engine accesses associated metadata or a manifest file for the content item. Content typically includes metadata. In some embodiments, metadata associated with the content may be accessed or transmitted and interpreted to determine a transition scene. In some embodiments, metadata associated with the received content may identify one or more transition scenes in a content item. In some embodiments, metadata can be programmed to identify one or more transition scenes. Streaming content may use a manifest file that may describe available stream segments and respective bit rates. A manifest may act as a playlist for downloading and playing smaller video segments. A manifest may also include XML code identifying one or more transition scenes. In some cases, there may be multiple types of transition and/or pause scenes and the metadata or manifest will reflect such changes. Manifest file 405A of FIG. 5E includes identification of one or more transition scenes.

At step 556, the transition engine analyzes associated metadata or manifest for scene data. In some embodiments, the transition engine reads the metadata associated with the received content to identify one or more transition scenes in the content item. In some embodiments, the transition engine may parse the XML code of the streaming manifest to identify each scene's beginning, ending, and whether it is a transition scene. Manifest file 405A of FIG. 5E includes identification of a transition scene.

At step 558, the transition engine determines one or more transition scenes based on scene data. For instance, the transition engine may identify one or more transition scenes from a group of scenes. In some embodiments, the transition engine may access a list of all transition scenes, e.g., to display in a guide/slider bar in the interface. In some embodiments, the transition engine may output a determination of a scene, e.g., scene B, is a transition scene or not.

FIG. 5C depicts an illustrative flowchart of a process for determining a transition scene, in accordance with some embodiments of the disclosure. There are many ways to determine a determining a transition scene, and process 560 of FIG. 5C is an exemplary method. Some embodiments may utilize a transition engine to perform one or more parts of process 560, e.g., as part of a content delivery platform or interactive content guidance application.

At step 562, the transition engine receives content with scenes A, B, and C. In process 560, scenes A, B, and C are sequential and may be any three consecutive scenes from a content item.

At step 564, the overlay engine extracts scenes from a content item. For instance, the transition engine extracts a scene from the content item as a video segment for analysis.

At step 566, the transition engine analyzes each of scenes A, B, and C for scene data. In some embodiments, scene data may be identified using image feature analysis and identifying characters and/or actions. In some embodiments, scene data of a content item may be detected by a presence/lack of dialogue or narration based on, e.g., measures of audio levels and/or captions. In some embodiments, scene data may be identified by text and/or using OCR. In some cases, scene data may be identified by comparing a plurality of frames and determining movement from frame to frame, e.g., typifying fast-moving or action sequences. In some embodiments, a machine learning algorithm may be applied to a neural network to generate a predictive model able to identify scene data, e.g., for transition scenes. FIG. 5G describes a process to train a model to label and/or categorize video scenes. In some embodiments, a combination of a neural network and image analysis may be used to determine scene data and/or identify transition scenes.

At step 568, the transition engine determines one or more transition scenes based on scene data. For instance, image analysis may identify presence of characters and/or activities from scene data. Some embodiments may identify transition scenes based on scene data comprising audio/captions, e.g., if there is limited dialogue, narration, or other sounds. The transition engine may identify one or more transition scenes from a group of scenes. In some embodiments, the transition engine may generate a list of all transition scenes based on scene data, e.g., to display in a guide/slider bar in the interface. In some embodiments, the transition engine may output a determination of a scene, e.g., scene B, is a transition scene or not.

FIG. 5D depicts an illustrative flowchart of a process for determining a screen position for overlays, in accordance with some embodiments of the disclosure. There are many ways to determine a screen position for overlaying a transition scene, and process 570 of FIG. 5D is an exemplary method. Some embodiments may utilize a transition engine to perform one or more parts of process 570, e.g., as part of a content delivery platform or interactive content guidance application.

At step 572, the transition engine receives content with scenes A, B, and C. In process 550, scenes A, B, and C are sequential and may be any three consecutive scenes from a content item.

At step 574, the transition engine accesses associated metadata or a manifest file for the content item. In some cases, metadata associated with the content may be accessed or transmitted and interpreted to find overlay information. In some embodiments, metadata associated with the received content may identify a region or screen coordinates where an overlay should or should not appear on screen. In compatible systems, metadata can be programmed to identify where additional on-screen information should or should not be positioned, e.g., by zone or coordinates. Streaming content may use a manifest file that may describe available stream segments and respective bit rates. A manifest may also include XML code identifying the coordinates of a box appearing around an area of a screen that should not be overlayed. In some cases, the prohibited zone may change position and the metadata or manifest will reflect the change. Manifest file 405B of FIG. 5F includes coordinates of zones that should or should not have overlays.

At step 576, the transition engine analyzes associated metadata or manifest for overlay position data. In some embodiments, the transition engine reads the metadata associated with the received content to identify a region (or screen coordinates) where an overlay should (or should not) appear on screen. In some embodiments, the transition engine may parse the XML code of the streaming manifest to identify a screen position (e.g., coordinates) of a zone where a character or activity may appear. Manifest file 405B of FIG. 5F includes coordinates of zone 112 that could have an overlay (e.g., available) and zone 114 that should not have an overlay (e.g., unavailable).

At step 578, the transition engine determines a first screen position based on overlay position data. For instance, the transition engine may produce coordinates or a region of the screen as unavailable coordinates, describing a location not to be overlayed. In some embodiments, the transition engine may produce a zone position box. For example, if zones 1-9 are labeled left to right and top to bottom, in a 3-by-3 rectangle, identifying a zone for availability or unavailability may be simpler for positioning an overlay. In some embodiments, the transition engine may receive a region or zone for an unavailable area, such as bottom-right of the screen, and must translate the region into coordinates. The screen may be considered a two-dimensional coordinate plane with the origin at the very center. In some embodiments, the transition engine may produce coordinates of the center of an unavailable zone, so that overlays are moved to opposite sides or corners. In some embodiments, the transition engine may produce coordinates of a rectangle framing a zone, so that overlays may be moved more precisely without overlap.

FIGS. 5E and 5F each depict an illustrative flow diagram of a process for providing content with a manifest, in accordance with some embodiments of the disclosure. FIG. 5E depicts an illustrative flow diagram of a process for providing content with a manifest identifying scenes, and FIG. 5F depicts an illustrative flow diagram of a process for providing content with a manifest with overlay coordinates. FIGS. 5E and 5F each depict a content delivery network comprising video server 401, streaming platform 403, and device 101. Generally, for instance, content 402 may be transmitted via a content delivery network comprising video server 401 to streaming platform 403 to device 101. In FIGS. 5E and 5F, content 402 is stored in memory at video server 401 and accessed by streaming platform 403 for delivery to device 101.

In some embodiments, metadata or a manifest file, such as manifest file 405A-B of FIGS. 5E-F, may be transmitted with or prior to transmission of content 402. In some embodiments, content 402 may comprise a plurality of segments, each segment a small content file, with a corresponding manifest identifying the segments to be downloaded and played in order like a playlist. Some embodiments may use adaptive bitrate streaming over HTTP (e.g., MPEG-DASH, HTTP Live Streaming, etc.) where the source content is encoded at multiple bitrates and each of the different bit rate streams is segmented into smaller parts of several seconds. A manifest file, such as manifest file 405A-B of FIGS. 5E-F, may describe available stream segments (e.g., as a playlist) and respective bit rates. An adaptive bitrate algorithm may be performed at a client, e.g., device 101, to decide which level of bit rate segments to download based on a current network state. For instance, device 101 may request high bitrate content segments when a network has high bandwidth available, but if device 101 finds that the network throughput has deteriorated, device 101 may request a lower bit rate segment or segments until network quality improves. In some embodiments, encoded content segments are stored at video server 401 for transmission to and decoding at device 101, as connected or facilitated by streaming platform 403. In some embodiments, a manifest file, such as manifest file 405A or 405B may be stored at video server 401 and passed on to device 101 via streaming platform 403 upon request. In some embodiments, a manifest file, such as manifest file 405A or 405B may be stored at streaming platform 403 and transmitted to device 101 upon request.

In some embodiments, such as the scenario depicted in FIG. 5E, content may be provided with a manifest describing scenes, e.g., whether a scene is a transition scene or not. In some embodiments, scenes may be identified by timestamps and/or runtimes. In some embodiments, scenes may be identified by subscenes, segments, or smaller video files. For instance, FIG. 5E illustrates one or more .tsv files in manifest file 405A associated with a start to each scene. In a manifest, each scene may be associated with one or more segment files. In some embodiments, specific segments identified in a manifest may be labeled with a scene identifier and/or a scene category. In some embodiments, a scene category may be just an identifier of whether the scene is a transition scene or not. For instance, segment "031.tsv" is labeled with "SCENE_ID={"006"}" and "SCENE_CAT={not_transition}" while "033.tsv" is labeled with "SCENE_ID-{"007"}" and "SCENE_CAT={transition}." In some embodiments, a scene category may describe characters, settings, actions, etc. A transition engine can interpret a manifest file, e.g., manifest file 405A, which scenes are transition scenes and identify transition scenes, e.g., in guide bar 140 on the screen of device 101.

In some embodiments, such as the scenario depicted in FIG. 5F, content may be provided with a manifest describing screen coordinates to be used in determining where to place an overlay. Zones may be set by coordinates defining a shape such as a rectangle, e.g., with the top-left coordinates and bottom-right coordinates identified in the manifest. In some embodiments, a manifest may include coordinates for where an overlay may be produced, e.g., without overlapping something important on screen. For instance, FIG. 5F illustrates that zone 112 on the screen of device 101 is available because, e.g., an overlay is permitted to be there, and manifest file 405B identifies that "AVAIL_CORD={X3, Y4,X4, Y4}" is available. FIG. 5F illustrates window 138 overlaying content in zone 112 without covering any characters and/or actions.

In some embodiments, a manifest may include coordinates for where an overlay may not be produced because, e.g., it may overlap important scene features. For instance, FIG. 5F illustrates that zone 114 on the screen of device 101 is unavailable because, e.g., a female character may be there, and manifest file 405B identifies that "UNAVAIL_CORD={X1, Y1,X2, Y2}" are unavailable for overlay. In some scenarios, such as those depicted in FIG. 5F, an overlay may be placed in a preferred zone 112 or placed anywhere outside of zone 114. For instance, a transition scene overlay may be placed so as not to cover zone 114 as important scene details occur there. In some embodiments, a manifest may include coordinates where or where not to produce an overlay for one or more segments listed within the manifest.

Some embodiments may include identification of one or more zones where an instrument or activity is found. For instance, a manifest may identify an instrument zone and/or an active zone. An instrument zone may be a zone on a screen where a key instrument of the content is tracked. For instance, a key instrument might be a ball, bat, base, goal, golf club, favorite or key player, important character, actor, speaker, or important device or person important to the content. An activity zone, for example, may be an area of the screen where an action occurs, such as pitching, shooting, striking of a ball, speaking, running, or otherwise performing. In some embodiments, an instrument zone and an active zone may be defined by a manifest for portions or segments of content and may change (or disappear). Zones may be set by coordinates defining a shape such as a rectangle, e.g., with the top-left coordinates and bottom-right coordinates identified in the manifest. In some embodiments, zones may be set by a coordinate defining the center of a circular shape identified in the manifest, e.g., with a radius in the manifest or set as a default by an interface.

FIG. 5G depicts an illustrative flow diagram of a process for training a machine learning model to determine transition scenes, in accordance with some embodiments of the disclosure. In some embodiments, detecting a transition scene may be accomplished with predictive modeling. For instance, a trained neural network may be used to classify a provided video scene data as either a transition scene or not a transition scene. Generally, a training set comprising video scene data comprising transition scenes and not transition scenes may be used by a neural network to predict whether new video scene data includes transition scene or not.

Training a neural network to accurately detect transition scenes may be accomplished in many ways. Some embodiments may use supervised learning where, e.g., a training data set includes labels identifying transition scenes (and/or not transition scenes). Some embodiments may use unsupervised learning that may identify transition scenes in training data by clustering similar data. Some embodiments may use semi-supervised learning where a portion of labeled video scene data may be combined with unlabeled data during training. In some embodiments, a reinforcement learning may be used. With reinforcement learning, a predictive model is trained from a series of actions by maximizing a "reward function," via rewarding correct labeling and penalizing improper labeling. Scenario 1500 includes data labels 1512, indicating a supervised or semi-supervised learning situation. A trained neural network may return a scene labeled by a category describing the scene or may simply be labeled as either a transition scene or not.

Scenario 1500 depicts training video scene data 1510 along with data labels 1512. Training data for transition scene identification may be collected by manually labeling training video scenes that are transition scenes. In some embodiments, video scene data may comprise audio data and visual data. Video scene data without transition scenes, e.g., from a control group, may also be captured and used. In some circumstances, an analyst may mark incoming video data with a label of "transition scene" or "not transition scene," e.g., in near real time, to create the training data set. From the video scene data collected, at least two groups of data may be created: training video scene data 1510 and test data 1524.

In scenario 1500, training video scene data 1510 is pre-processed using feature extraction to form training scene features 1516. Pre-processing of training data is used to obtain proper data for training. In some embodiments, pre-processing may involve, for example, scaling, translating, rotating, converting, normalizing, changing of bases, and/or translating coordinate systems in video and/or audio scene data. In some embodiments, pre-processing may involve filtering video and/or audio scene data, e.g., to eliminate video and/or audio scene noise.

After pre-processing, training scene features 1516 are fed into Machine Learning Algorithm (MLA) 1520 to generate an initial machine learning model, e.g., scene predictive model 1540. In some embodiments, MLA 1520 uses numbers between 0 and 1 to determine whether the provided data, e.g., training scene features 1516, includes a transition scene or not. The more data that is provided, the more accurate MLA 1520 will be in creating a model, e.g., scene predictive model 1540.

Once MLA 1520 creates scene predictive model 1540, test data may be fed into the model to verify the system and test how accurately model 1540 behaves. In some embodiments, test data 1524 is pre-processed to become a scene feature 1536 and passed to scene predictive model 1540 for a prediction. Scene predictive model 1540 identifies whether the input test data includes a scene or not. In some embodiments, each iteration of test data 1524 is classified and reviewed for accuracy. For example, if expected label 1550 is not correct, false result 1552 may be fed as learning data back into MLA 1520. If, after test data 1524 is classified and reviewed, model 1540 does not perform as expected (e.g., an error rate below 5%) then additional training data may be provided until the model meets the expected criteria. In some embodiments, a reinforcement learning method may be incorporated with test data to reward or punish MLA 1520.

Once scene predictive model 1540 works as expected, new real-time data may be fed to the model, and determinations of whether the data includes a transition scene may be predicted with confidence. For instance, in scenario 1500, new video scene data 1530 may be pre-processed as a scene feature 1536 and passed to scene predictive model 1540 for a prediction. Scene predictive model 1540 may evaluate scene feature 1536 and present a label of transition scene or no transition scene for the data. If new video scene data can be verified outside the system, model 1540 may be further updated with feedback and reinforcement for further accuracy.

FIG. 6 is a diagram of an illustrative device, in accordance with some embodiments of the disclosure. Device 600 may be implemented by a device or system, e.g., a device providing a display to a user, or any other suitable control circuitry configured to generate a display to a user of content. For example, device 600 of FIG. 6 can be implemented as equipment 601. In some embodiments, equipment 601 may include set-top box 616 that includes, or is communicatively coupled to, display 612, audio equipment 614 (e.g., speakers or headphones), microphone 616, camera 618, and user input interface 610. In some embodiments, display 612 may include a television display or a computer display. In some embodiments, user interface input 610 is a remote-control device. Set-top box 616 may include one or more circuit boards. In some embodiments, the one or more circuit boards include processing circuitry, control circuitry, and storage (e.g., RAM, ROM, hard disk, removable disk, etc.). In some embodiments, circuit boards include an input/output path. Each one of device 600 and equipment 601 may receive content and receive data via input/output (hereinafter "I/O") path 602. I/O path 602 may provide content and receive data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communication paths (described below). I/O functions may be provided by one or more of these communication paths but are shown as a single path in FIG. 6 to avoid overcomplicating the drawing. While set-top box 616 is shown in FIG. 6 for illustration, any suitable computing device having processing circuitry, control circuitry, and storage may be used in accordance with the present disclosure. For example, set-top box 616 may be replaced by, or complemented by, a personal computer (e.g., a notebook, a laptop, a desktop), a smartphone (e.g., device 600), a tablet, a network-based server hosting a user-accessible client device, a non-user-owned device, any other suitable device, or any combination thereof.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for an application transition engine stored in memory (e.g., storage 608). Specifically, control circuitry 604 may be instructed by the application to perform the functions discussed above and below. For example, the application may provide instructions to control circuitry 604 to determine screen positions. In some implementations, any action performed by control circuitry 604 may be based on instructions received from the application.

In some client/server-based embodiments, control circuitry 604 includes communications circuitry suitable for communicating with an application server. A transition engine may be a stand-alone application implemented on a device or a server. A transition engine may be implemented as software or a set of executable instructions. The instructions for performing any of the embodiments discussed herein of the transition engine may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, in FIG. 6, the instructions may be stored in storage 608, and executed by control circuitry 604 of a device 600.

In some embodiments, a transition engine may be a client/server application where only the client application resides on device 600 (e.g., devices 702A-F), and a server application resides on an external server (e.g., server 706). For example, a transition engine may be implemented partially as a client application on control circuitry 604 of device 600 and partially on server 706 as a server application running on control circuitry. Server 706 may be a part of a local area network with one or more of devices 702A-F or may be part of a cloud computing environment accessed via the internet. In a cloud computing environment, various types of computing services for performing searches on the internet or informational databases, providing storage (e.g., for a database or scoring table) or parsing data are provided by a collection of network-accessible computing and storage resources (e.g., server 706), referred to as "the cloud." Device 600 may be a cloud client that relies on the cloud computing capabilities from server 706 to identify transition scenes and provide overlays. When executed by control circuitry of server 706, the transition engine may instruct the control circuitry to generate the transition engine output (e.g., providing content and/or identifying transition elements) and transmit the generated output to one or more of devices 702A-F. The client application may instruct control circuitry of the receiving device 702A-F to generate the transition engine output. Alternatively, one or more of devices 702A-F may perform all computations locally via control circuitry 604 without relying on server 706.

Control circuitry 604 may include communications circuitry suitable for communicating with a transition engine server, a table or database server, or other networks or servers. The instructions for carrying out the above-mentioned functionality may be stored and executed on the application server 706. Communications circuitry may include a cable modem, an integrated-services digital network (ISDN) modem, a digital subscriber line (DSL) modem, a telephone modem, an ethernet card, or a wireless modem for communications with other equipment, or any other suitable communications circuitry. Such communications may involve the internet or any other suitable communication network or paths. In addition, communications circuitry may include circuitry that enables peer-to-peer communication of devices, or communication of devices in locations remote from each other.

Memory may be an electronic storage device such as storage 608, which is part of control circuitry 604. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, gaming media, or any other suitable fixed or removable storage devices, and/or any combination of the same. Storage 608 may be used to store various types of content described herein as well as content guidance data described above. Nonvolatile memory may also be used (e.g., to launch a boot-up routine and other instructions). Cloud-based storage, for example, (e.g., on server 706) may be used to supplement storage 608 or instead of storage 608.

A user may send instructions to control circuitry 604 using user input interface 610. User input interface 610 and display 612 may be any suitable interface such as a touchscreen, touchpad, or stylus and/or may be responsive to external device add-ons, such as a remote control, mouse, trackball, keypad, keyboard, joystick, voice recognition interface, or other user input interfaces. Display 612 may include a touchscreen configured to provide a display and receive haptic input. For example, the touchscreen may be configured to receive haptic input from a finger, a stylus, or both. In some embodiments, equipment device 600 may include a front-facing screen and a rear-facing screen, multiple front screens, or multiple angled screens. In some embodiments, user input interface 610 includes a remote-control device having one or more microphones, buttons, keypads, any other components configured to receive user input or combinations thereof. For example, user input interface 610 may include a handheld remote-control device having an alphanumeric keypad and option buttons. In a further example, user input interface 610 may include a handheld remote-control device having a microphone and control circuitry configured to receive and identify voice commands and transmit information to set-top box 616.

Audio equipment 614 may be integrated with or combined with display 612. Display 612 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 612. Audio equipment 614 may be provided as integrated with other elements of each one of device 600 and equipment 601 or may be stand-alone units. An audio component of videos and other content displayed on display 612 may be played through speakers (or headphones) of audio equipment 614. In some embodiments, audio may be distributed to a receiver (not shown), which processes and outputs the audio via speakers of audio equipment 614. In some embodiments, for example, control circuitry 604 is configured to provide audio cues to a user, or other audio feedback to a user, using speakers of audio equipment 614. There may be a separate microphone 616 or audio equipment 614 may include a microphone configured to receive audio input such as voice commands or speech. For example, a user may speak letters or words that are received by the microphone and converted to text by control circuitry 604. In a further example, a user may voice commands that are received by a microphone and recognized by control circuitry 604. Camera 618 may be any suitable video camera integrated with the equipment or externally connected. Camera 618 may be a digital camera comprising a charge-coupled device (CCD) and/or a complementary metal-oxide semiconductor (CMOS) image sensor. Camera 618 may be an analog camera that converts to digital images via a video card.

An application (e.g., for generating a display) may be implemented using any suitable architecture. For example, a stand-alone application may be wholly implemented on each one of device 600 and equipment 601. In some such embodiments, instructions of the application are stored locally (e.g., in storage 608), and data for use by the application is downloaded on a periodic basis (e.g., from an out-of-band feed, from an internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected. An application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 604 may allow a user to provide user profile information or may automatically compile user profile information. For example, control circuitry 604 may access and monitor network data, video data, audio data, processing data, participation data from a participant profile. In some embodiments, control circuitry 604 may calculate several scores, such as a readiness score, based on profile data. Control circuitry 604 may store scores in a database and the database may be linked to a user profile. Additionally, control circuitry 604 may obtain all or part of other user profiles that are related to a particular user (e.g., via social media networks), and/or obtain information about the user from other sources that control circuitry 604 may access. As a result, a user can be provided with a unified experience across different devices.

In some embodiments, the application is a client/server-based application. Data for use by a thick or thin client implemented on each one of device 600 and equipment 601 is retrieved on demand by issuing requests to a server remote from each one of device 600 and equipment 601. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on device 600. This way, the processing of the instructions is performed remotely by the server while the resulting displays (e.g., that may include text, a keyboard, or other visuals) are provided locally on device 600. Device 600 may receive inputs from the user via input interface 610 and transmit those inputs to the remote server for processing and generating the corresponding displays. For example, device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to device 600 for presentation to the user.

As depicted in FIG. 7, one or more of devices 702A-F may be coupled to communication network 704. Communication network 704 may be one or more networks including the internet, a mobile phone network, mobile voice or data network (e.g., a 5G or 4G or LTE network), cable network, public switched telephone network, Bluetooth, or other types of communication network or combinations of communication networks. Thus, devices 702A-F may communicate with server 706 over communication network 704 via communications circuitry described above. In should be noted that there may be more than one server 706, but only one is shown in FIG. 7 to avoid overcomplicating the drawing. The arrows connecting the respective device(s) and server(s) represent communication paths, which may include a satellite path, a fiber-optic path, a cable path, a path that supports internet communications (e.g., IPTV), free-space connections (e.g., for broadcast or other wireless signals), or any other suitable wired or wireless communication path or combination of such paths.

In some embodiments, the application is downloaded and interpreted or otherwise run by an interpreter or virtual machine (e.g., run by control circuitry 604). In some embodiments, the application may be encoded in the ETV Binary Interchange Format (EBIF), received by control circuitry 604 as part of a suitable feed, and interpreted by a user agent running on control circuitry 604. For example, the application may be an EBIF application. In some embodiments, the application may be defined by a series of JAVA-based files that are received and run by a local virtual machine or other suitable middleware executed by control circuitry 604.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   receiving content comprising a plurality of segments of a content item, the plurality of segments comprising a first segment of the plurality of segments, followed by a second segment of the plurality of segments, followed by a third segment of the plurality of segments that are displayed during playback of the content item;

determining whether the second segment is a transition segment;

based in part on determining that the second segment is a transition segment:
(i) removing the second segment from playback;
(ii) identifying an available screen zone for displaying the second segment; and
(ii) generating for display at a user device the first segment and the third segment while the removed second segment is simultaneously displayed as an overlay in the identified available screen zone during playback of the first segment or the third segment of the content item.

2. The method of claim 1, wherein the second segment is displayed as an overlay in the identified available screen zone during playback of the first segment.

3. The method of claim 1, wherein the second segment is displayed as an overlay in the identified available screen zone during playback of the third segment.

4. The method of claim 1, wherein the second segment comprises a first portion and a second portion, and wherein the first portion of the second segment is displayed as an overlay in the identified available screen zone during playback of the first segment and the second portion of the second segment is displayed as an overlay in the identified available screen zone during playback of the third segment.

5. The method of claim 1, wherein the identified available screen zone comprises a first screen location when the second segment is displayed during display of the first segment and a second screen location when the second segment is displayed during display of the third segment.

6. The method of claim 5, wherein the first screen location is different than the second screen location.

7. The method of claim 5, wherein the first screen location is the same as the second screen location.

8. The method of claim 1, further comprising displaying a guide bar while the content item is displayed.

9. The method of claim 8, wherein the guide bar comprises a transition segment indicator, wherein the transition segment indicator indicates the presence of one or more transition segments.

10. The method of claim 1, wherein determining whether the second segment is a transition segment is based on metadata of the content item, a manifest file related to the content item, dialog in the second segment, or a narration of the second segment.

11. A system comprising:
input output circuitry configured to:
receive content comprising a plurality of segments of a content item, the plurality of segments comprising a first segment of the plurality of segments, followed by a second segment of the plurality of segments, followed by a third segment of the plurality of segments that are displayed during playback of the content item;

processing circuitry configured to:
determine whether the second segment is a transition segment;
based on determining that the second segment is a transition segment:
(i) remove the second segment from playback;
(ii) identify an available screen zone for displaying the second segment; and
(ii) generate for display at a user device the first segment and the third segment while the removed second segment is simultaneously displayed as an overlay in the identified available screen zone during playback of the first segment or the third segment of the content item.

12. The system of claim 11, wherein the second segment is displayed as an overlay in the identified available screen zone during playback of the first segment.

13. The system of claim 11, wherein the second segment is displayed as an overlay in the identified available screen zone during playback of the third segment.

14. The system of claim 11, wherein the second segment comprises a first portion and a second portion, and wherein the first portion of the second segment is displayed as an overlay in the identified available screen zone during playback of the first segment and the second portion of the second segment is displayed as an overlay in the identified available screen zone during playback of the third segment.

15. The system of claim 11, wherein the identified available screen zone comprises a first screen location when the second segment is displayed during display of the first segment and a second screen location when the second segment is displayed during display of the third segment.

16. The system of claim 15, wherein the first screen location is different than the second screen location.

17. The system of claim 15, wherein the first screen location is the same as the second screen location.

18. The system of claim 11, wherein the processing circuitry is further configured to display a guide bar while the content item is displayed.

19. The system of claim 18, wherein the guide bar comprises a transition segment indicator, wherein the transition segment indicator indicates the presence of one or more transition segments.

20. The system of claim 11, wherein determining whether the second segment is a transition segment is based on metadata of the content item, a manifest file related to the content item, dialog in the second segment, or a narration of the second segment.

* * * * *